(12) United States Patent
Santillo et al.

(10) Patent No.: US 8,260,440 B2
(45) Date of Patent: Sep. 4, 2012

(54) ADAPTIVE CONTROL BASED ON RETROSPECTIVE COST OPTIMIZATION

(75) Inventors: Mario A. Santillo, North Chili, NY (US); Dennis S. Bernstein, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 296 days.

(21) Appl. No.: 12/630,004

(22) Filed: Dec. 3, 2009

(65) Prior Publication Data

US 2010/0142662 A1    Jun. 10, 2010

Related U.S. Application Data

(60) Provisional application No. 61/201,035, filed on Dec. 5, 2008.

(51) Int. Cl.
*G05B 13/02* (2006.01)
*G06F 19/00* (2011.01)
*G05B 19/18* (2006.01)
*G06F 15/18* (2006.01)

(52) U.S. Cl. ............. 700/28; 700/173; 700/250; 706/14
(58) Field of Classification Search .............. 700/28, 700/173, 250; 706/14
See application file for complete search history.

(56) References Cited

U.S. PATENT DOCUMENTS

| | | | | |
|---|---|---|---|---|
| 5,424,942 | A * | 6/1995 | Dong et al. | 700/44 |
| 6,208,739 | B1 | 3/2001 | Venugopal et al. | |
| 6,208,914 | B1 | 3/2001 | Ward et al. | |
| 6,263,355 | B1 * | 7/2001 | Harrell et al. | 708/320 |
| 6,351,740 | B1 * | 2/2002 | Rabinowitz | 706/22 |
| 6,373,033 | B1 * | 4/2002 | de Waard et al. | 219/497 |
| 2001/0044789 | A1 | 11/2001 | Widrow et al. | |
| 2004/0176861 | A1 * | 9/2004 | Butler | 700/63 |
| 2007/0162161 | A1 * | 7/2007 | Kumar | 700/29 |

OTHER PUBLICATIONS

Hoagg et al. (Discrete-Time Adaptive Feedback Disturbance Rejection using a Retrospective Performance Measure, 2004).*
Hoagg et al., Discrete-Time Adaptive Command Following and Disturbance Rejection With Unknown Exogeneous Dynamics, IEEE, 2008.*
Wang et al., Predictive Control Development for Non-Minimum Phase Processes with Application in Food Manufacturing, Proceedings of the American. Control Conf., 1995).*
Venugopal et al. (Adaptive Disturbance Rejection Using ARMAKOV/Toeplitz Models, IEEE, 2000).*

(Continued)

*Primary Examiner* — Albert Decady
*Assistant Examiner* — Darrin Dunn
(74) *Attorney, Agent, or Firm* — Harness, Dickey & Pierce, P.L.C.

(57) ABSTRACT

A discrete-time adaptive control law for stabilization, command following, and disturbance rejection that is effective for systems that are unstable, MIMO, and/or nonminimum phase. The adaptive control algorithm includes guidelines concerning the modeling information needed for implementation. This information includes the relative degree, the first nonzero Markov parameter, and the nonminimum-phase zeros. Except when the plant has nonminimum-phase zeros whose absolute value is less than the plant's spectral radius, the required zero information can be approximated by a sufficient number of Markov parameters. No additional information about the poles or zeros need be known. Numerical examples are presented to illustrate the algorithm's effectiveness in handling systems with errors in the required modeling data, unknown latency, sensor noise, and saturation.

17 Claims, 17 Drawing Sheets

OTHER PUBLICATIONS

Rizzo et al., CFD-Based Adaptive Flow Control Using ARMAKOV Disturbance Rejection, Proceedings of the 2006 American Control Conference.*

Costa, R. et al., "Lyapunov-based adaptive control of MIMO systems", In: Auto matatica, vol. 39, Issue 7, Jul. 2003, pp. 1251-1257.

Dang, H, et al., "MIMO Multi-periodic Repetitive Control System: Adaptive Control Schemes", In: Proceedings of 43rd IEEE Conference on Decision and Control vol. 2, Dec. 14-17, 2004, pp. 1325-1330.

International Search Report and Written Opinion, PCT/US2009/066793 dated Jun. 23, 2010.

Praly, L., Hung, S.T., and Rhode, D.S., "Towards a Direct Adaptive Scheme for a Discrete-Time Control of a Minimum Phase Continuous-Time System", IEEE Proceedings of 24th Conference on Decision and Control, Ft. Lauderdale, FL, Dec. 1985 (pp. 1188-1191).

Hoagg, J. & Bernstein, D., "Nonminimum-Phase Zeros—Much to Do About Nothing," IEEE Control Systems Magazine, (Jun. 2007), vol. 27, Issue 3, pp. 45-57.

Yan, J., et al., "Longitudinal Aircraft Dynamics and the Instantaneous Acceleration Center of Rotation: The Case of the Vanishing Zeros," IEEE Control Systems Magazine, (Aug. 2011), vol. 31, Issue 4, pp. 68-92.

* cited by examiner

ADAPTIVE CONTROL BASED ON RETROSPECTIVE COST OPTIMIZATION

CROSS-REFERENCE TO RELATED APPLICATIONS

This application claims the benefit of U.S. Provisional Application No. 61/201,035 filed on Dec. 5, 2008. The entire disclosure of the above application is incorporated herein by reference.

This application is also related to U.S. Pat. No. 6,208,739, issued on Mar. 27, 2001, which is incorporated herein by reference.

GOVERNMENT SUPPORT

This invention was made with government support under Grant No. NNX08AB92A awarded by NASA. The government has certain rights in the invention.

FIELD

The present disclosure relates to methods and control systems for using a digital adaptive control algorithm and, more particularly, relates to methods and control systems for using a digital adaptive control algorithm that are based on a retrospective correction feedback filter.

BACKGROUND AND SUMMARY

This section provides background information related to the present disclosure which is not necessarily prior art. This section also provides a general summary of the disclosure, and is not a comprehensive disclosure of its full scope or all of its features.

Unlike robust control, which chooses control gains based on a prior, fixed level of modeling uncertainty, adaptive control algorithms tune the feedback gains in response to the true dynamical system (or "plant"), and commands and disturbances (collectively "exogenous signals"). Generally speaking, adaptive controllers require less prior modeling information than robust controllers, and thus can be viewed as highly parameter-robust control laws. The price paid for the ability of adaptive control laws to operate with limited prior modeling information is the complexity of analyzing and quantifying the stability and performance of the closed-loop system, especially in light of the fact that adaptive control laws, even for linear plants, are nonlinear.

Stability and performance analysis of adaptive control laws often entails assumptions on the dynamics of the plant. For example, a widely invoked assumption in adaptive control is passivity, which is restrictive and difficult to verify in practice. A related assumption is that the plant is minimum phase, which may entail the same difficulties. In fact, sampling may give rise to nonminimum-phase zeros whether or not the continuous-time system is minimum phase, which must ultimately be accounted for by any adaptive control algorithm implemented digitally in a sampled-data control system. Beyond these assumptions, adaptive control laws are known to be sensitive to unmodeled dynamics and sensor noise, which necessitates robust adaptive control laws.

In addition to these basic issues, adaptive control laws may entail unacceptable transients during adaptation, which may be exacerbated by actuator limitations. In fact, adaptive control under extremely limited modeling information, such as uncertainty in the sign of the high-frequency gain, may yield a transient response that exceeds the practical limits of the plant. Therefore, the type and quality of the available modeling information as well as the speed of adaptation must be considered in the analysis and implementation of adaptive control laws.

Adaptive control laws have been developed in both continuous-time and discrete-time settings. In the present application we consider discrete-time adaptive control laws since these control laws can be implemented directly in embedded code for sampled-data control systems without requiring an intermediate discretization step that may entail loss of stability margins.

According to some prior art, references on discrete-time adaptive control include a discrete-time adaptive control law with guaranteed stability developed under a minimum-phase assumption. Extensions based on internal model control and Lyapunov analysis also invoke this assumption. To circumvent the minimum-phase assumption, the zero annihilation periodic control law uses lifting to move all of the plant zeros to the origin. The drawback of lifting, however, is the need for open-loop operation during alternating data windows. An alternative approach, is to exploit knowledge of the nonminimum-phase zeros. Knowledge of the nonminimum-phase zeros is used to allow matching of a desired closed-loop transfer function, recognizing that minimum-phase zeros can be canceled but not moved, whereas nonminimum-phase zeros can neither be canceled nor moved. Knowledge of a diagonal matrix that contains the nonminimum-phase zeros is used within a MIMO direct adaptive control algorithm. Finally, knowledge of the unstable zeros of a rapidly sampled continuous-time SISO system with a real nonminimum-phase zero is used in some instances.

Motivated by the adaptive control laws given in some instances, the goal of the present application is to develop a discrete-time adaptive control law that is effective for nonminimum-phase systems. In particular, we present an adaptive control algorithm that extends the retrospective cost optimization approach. This extension is based on a retrospective cost that includes control weighting as well as a learning rate, which can be used to adjust the rate of controller convergence and thus the transient behavior of the closed-loop system. Unlike some instances, which use a gradient update, the present application uses a Newton-like update for the controller gains as the closed-form solution to a quadratic optimization problem. No off-line calculations are needed to implement the algorithm or control system. A key aspect of this extension is the fact that the required modeling information is the relative degree, the first nonzero Markov parameter, and nonminimum-phase zeros, if any. Except when the plant has nonminimum-phase zeros whose absolute value is less than the plant's spectral radius, we show that the required zero information can be approximated by a sufficient number of Markov parameters from the control inputs to the performance variables. No matching conditions are required on either the plant uncertainty or disturbances.

In some embodiments, a goal of the present application is to develop the RCF adaptive control algorithm and demonstrate its effectiveness for handling nonminimum-phase zeros. To this end we consider a sequence of examples of increasing complexity, ranging from SISO, minimum-phase plants to MIMO, nonminimum-phase plants, including stable and unstable cases. We then revisit these plants under off-nominal conditions, that is, with uncertainty in the required plant modeling data, unknown latency, sensor noise, and saturation. These numerical examples provide guidance into choosing the design parameters of the adaptive control law in terms of the learning rate, data window size, controller order, modeling data, and control weightings.

According to the principles of the present teachings, a discrete-time adaptive control law or algorithm for stabilization, command following, and disturbance rejection that is effective for systems that are unstable, MIMO, and/or non-minimum phase. The adaptive control algorithm includes guidelines concerning the modeling information needed for implementation. This information includes the relative degree, the first nonzero Markov parameter, and the nonminimum-phase zeros. Except when the plant has nonminimum-phase zeros whose absolute value is less than the plant's spectral radius, the required zero information can be approximated by a sufficient number of Markov parameters. No additional information about the poles or zeros need be known. We present numerical examples to illustrate the algorithm's effectiveness in handling systems with errors in the required modeling data, unknown latency, sensor noise, and saturation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 depicts a closed-loop system including adaptive control algorithm with the retrospective correction filter (dashed box) for p=1.

FIG. 2 depicts roots of $p_{20}(q)$ for the stable, non-minimum-phase plant in Example 5.1. The dashed line denotes $\rho(A)=0.95$. Note that the roots outside $\rho(A)$ are close to the outer nonminimum-phase zeros −1.5 and 1.25. The remaining roots are either located at the origin or form an approximate ring with radius close to $\rho(A)$.

FIG. 3 depicts roots of $p_{25}(q)$ for the unstable, nonminimum-phase plant in Example 5.2. The dashed line denotes $\rho(A)=1.4$. Note that the root of $p_{25}(q)$ outside $\rho(A)$ is close to the outer nonminimum-phase zero −1.5. However, the nonminimum-phase zero 1.25 is not approximated by a root of $p_{25}(q)$. The remaining roots are either located at the origin or form an approximate ring with radius close to $\rho(A)$.

FIG. 4 depicts roots of $\tilde{p}_{25}(q)$ for the unstable, nonminimum-phase plant in Example 5.3. The dashed line denotes $\rho(\tilde{A})=0.95$, where $\tilde{A}$ is the dynamics matrix of a minimal realization of $\tilde{G}_{zu}$. Note that the roots outside $\rho(\tilde{A})$ are close to the inner and outer nonminimum-phase zeros of $G_{zu}$. The remaining roots are either located at the origin or form an approximate ring with radius close to $\rho(\tilde{A})$.

FIG. 5 depicts closed-loop response of the unstable, minimum-phase, SISO plant in Example 7.1 using the nonminimum-phase-zero-based construction of $\overline{B}_{zu}$. The control is turned on at k=0. The controller order is $n_c$=2 with parameters p=1 and $\alpha(k)\equiv 10$.

FIG. 6 depicts closed-loop response of the unstable, minimum-phase, SISO plant in Example 7.2 with a step command. The control is turned on at k=200. The controller order is $n_c$=10 with parameters p=5, $\alpha(k)\equiv 5$, and r=10 with $\overline{B}_{zu}$ given by (56).

FIG. 7 depicts closed-loop response of the stable, minimum-phase, SISO plant in Example 7.1 with a step command and sinusoidal disturbance. The control is turned on at k=200. The controller order is $n_c$=20 with parameters p=1, $\alpha(k)\equiv 50$, and r=3 with $\overline{B}_{zu}$ given by (56).

FIG. 8 depicts closed-loop disturbance-rejection response of the stable, minimum-phase, SISO plant in Example 7.4. The control is turned on at k=200. The controller order is $n_c$=15 with parameters p=1, $\alpha(k)\equiv 25$, and r=3 with $\overline{B}_{zu}$ given by (56).

FIG. 9 depicts time history of the components of θ(k) for the stable, minimum-phase, SISO plant in Example 7.4. The control is turned on at k=200.

FIG. 10 depicts bode magnitude plot of the adaptive controller in Example 7.4 at k=1000 samples. The adaptive controller places poles at the disturbance frequencies $\Omega_1=\pi/10$ rad/sample and $\Omega_2 13\pi/50$ rad/sample. The controller magnitude $|G_c(e^{j\Omega})|$ is plotted for $\Omega$ up to the Nyquist frequency $\Omega_{Nyq}=\pi$ rad/sample.

FIG. 11 depicts closed-loop disturbance-rejection response of the stable, nonminimum-phase, SISO plant in Example 7.5. The control is turned on at k=200. The controller order is $n_c$15 with parameters p=1, $\alpha(k)\equiv 25$, and r=7 with $\overline{B}_{zu}$ given by (56).

FIG. 12 depicts closed-loop disturbance-rejection response of the stable, nonminimum-phase, SISO plant in Example 7.5. The control is turned on at k=200. The controller order is $n_c$15 with parameters p=1, $\alpha(k)\equiv 2500$, and r=7 with $\overline{B}_{zu}$ given by (56). Compared to FIG. 11, the initial transient is reduced at the expense of convergence speed.

FIG. 13 depicts closed-loop disturbance-rejection response of the unstable, minimum-phase, SISO plant in Example 7.6. The control is turned on at k=200. The controller order is $n_c$=15 with parameters p=1, $\alpha(k)\equiv 25$, and r=10 with $\overline{B}_{zu}$ given by (56).

FIG. 14 depicts closed-loop disturbance-rejection response of the stable, minimum-phase, two-input, two-output plant in Example 7.7. The control is turned on at k=200. The controller order is $n_c$=15 with parameters p=1, $\alpha(k)\equiv 1$, and r=10 with $\overline{B}_{zu}$ given by (56).

FIG. 15 depicts closed-loop disturbance-rejection response of the stable, nonminimum-phase, two-input, two-output plant in Example 7.8. The control is turned on at k=200. The controller order is $n_c$=15 with parameters p=2, $\alpha(k)\equiv 1$, and r=8 with $\overline{B}_{zu}$ given by (56).

FIG. 16 depicts closed-loop disturbance-rejection response of the unstable, nonminimum-phase, two-input, two-output plant in Example 7.9. The control is turned on at k=200. The controller order is $n_c$=10 with parameters p=1, $\alpha(k)\equiv 1$, and r=10 with $\overline{B}_{zu}$ given by (56).

FIG. 17 depicts closed-loop performance comparison of the stable, nonminimum-phase, SISO plant in Example 7.5 with multiplicative error in B. We take $n_c$=10, p=1, and $\alpha(k)\equiv 1000$. The multiplicative error η, which is used to obtain the Markov parameters for $\overline{B}_{zu}$ given by (56) with r=10, is varied between 0.3 and 5. The best performance is obtained for η=1, which corresponds to the true value of B.

FIG. 18 depicts closed-loop performance comparison of the stable, nonminimum-phase, SISO plant in Example 8.3 with a multiplicative error in the nonminimum-phase zero 2. We take $n_c$=10, p=1, and $\alpha(k)\equiv 25$. The nonminimum-phase-zero multiplicative error η, which is used to construct $\overline{B}_{zu}$ given by (52), is varied between 0.75 and 2.5. The best performance is obtained for η=1.05, which is close to the true value of the nonminimum-phase zero.

FIG. 19 depicts closed-loop response of the unstable, minimum-phase, SISO plant in Example 7.6 with random white noise added to the measurement. The control is turned on at k=0. The controller order is $n_c$=15 with parameters p=1, $\alpha(k)\equiv 25$, and r=3 with $\overline{B}_{zu}$ given by (56). The performance variable is degraded to the level of the additive sensor noise v(k).

FIG. 20 depicts closed-loop disturbance-rejection response of the stable, minimum-phase, SISO plant in Example 7.4, where both the actuator and sensor are saturated at ±2. The control is turned on at k=200. The controller order is $n_c$=15 with parameters p=1, $\alpha(k)\equiv 25$, and r=3 with $\overline{B}_{zu}$ given by (56). The saturations degrade steady-state performance.

FIG. 21 depicts closed-loop step-command-following responses of the stable, minimum-phase, SISO plant in Example 7.4 with and without actuator saturation at ±0.1. The control is turned on at k=200. The controller order is $n_c$=15 with parameters p=1, $\alpha(k)\equiv 25$, and r=3 with $\overline{B}_{zu}$ given by (56).

FIG. 22 depicts model reference adaptive control problem with performance variable z.

FIG. 23 depicts closed-loop model reference adaptive control of Boeing 747 longitudinal dynamics. The controller order is $n_c$=10 with parameters p=1, $\alpha(k)\equiv 40$, and r=10 with $\overline{B}_{zu}$ given by (56). The controller is turned on at t=0 sec, and the performance variable converges within about 20 sec.

FIG. 24 depicts closed-loop model reference adaptive control of missile longitudinal dynamics. The control effectiveness $\lambda$=1, and thus the plant and reference model are identical. Therefore, the adaptive control input $u_{ac}$=0.

Figure 27:
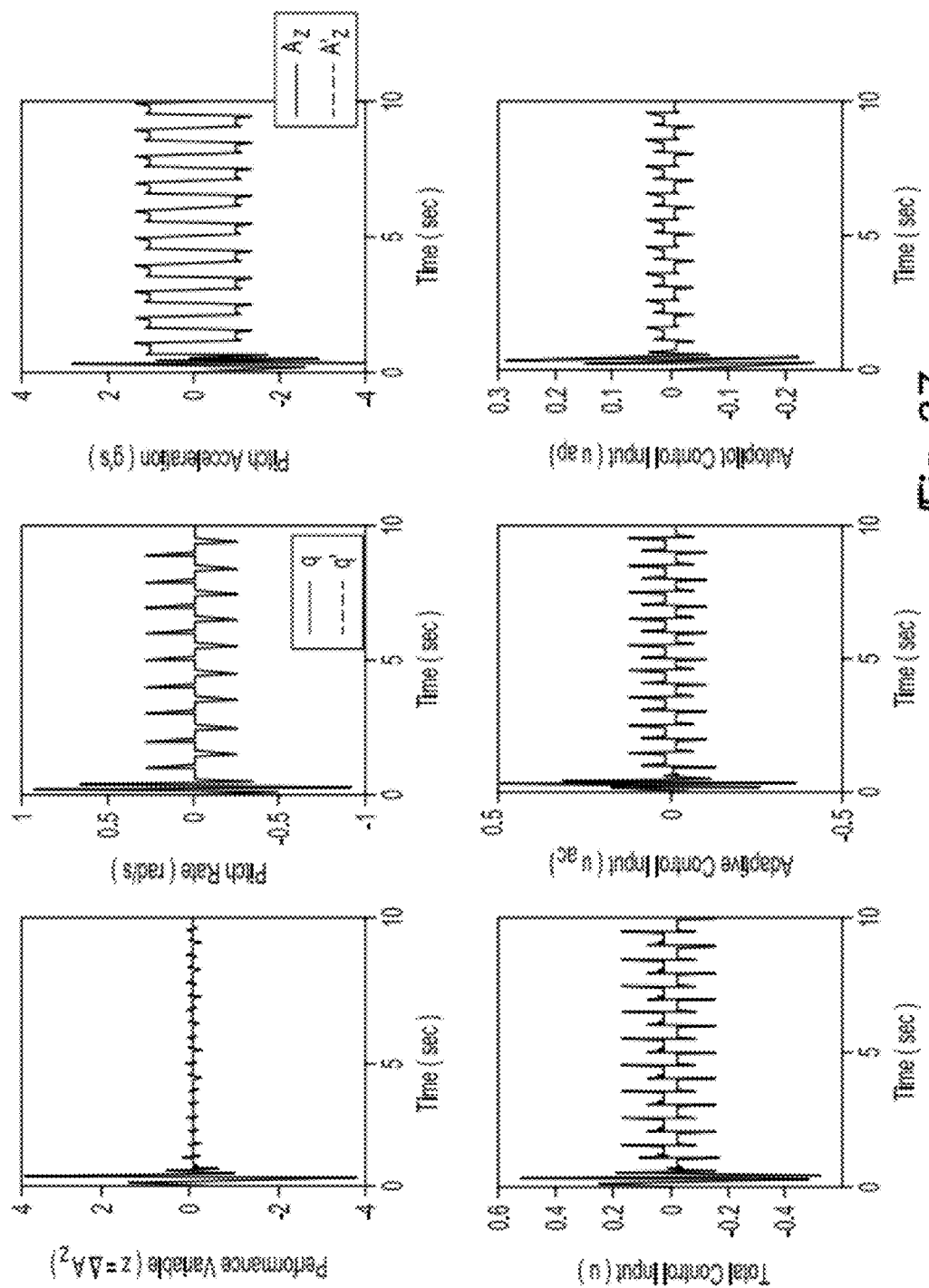

FIG. 27 depicts closed-loop model reference adaptive control of missile longitudinal dynamics with control effectiveness $\lambda$=0.25. After a transient, the augmented controllers stabilize the system, whereas the autopilot-only simulation fails. Note that the system is stabilized despite the total control input u reaching the actuator saturation level of ±30 deg.

Figure 28:
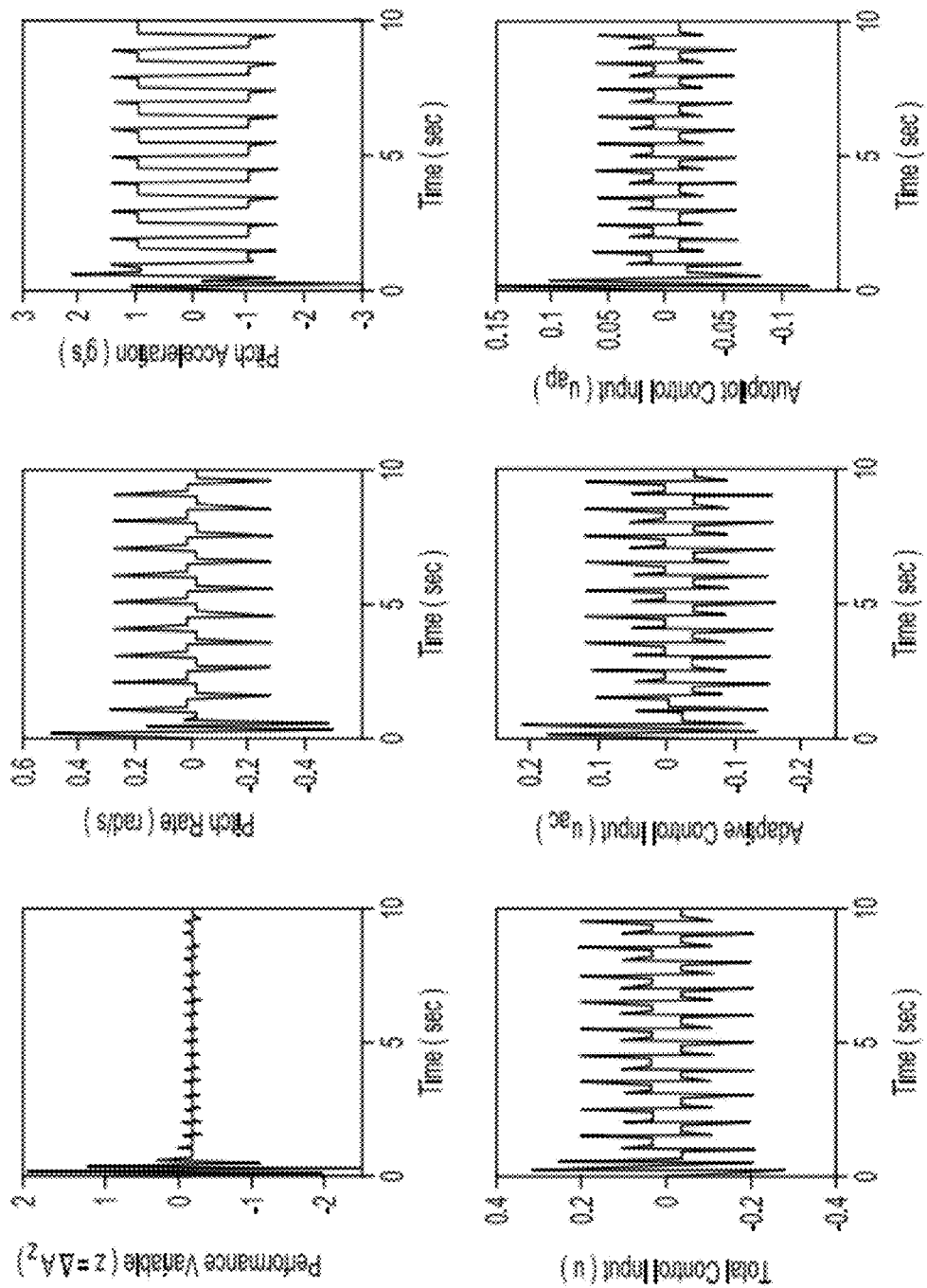

FIG. 28 depicts closed-loop model reference adaptive control of missile longitudinal dynamics with control effectiveness $\lambda$=0.25. The adaptive controller is initialized with the converged gains from the 50% control effectiveness case. The initial transient is reduced as compared with initializing the control gains to zero. In this case, the actuator saturation level is never reached.

Corresponding reference numerals indicate corresponding parts throughout the several views of the drawings.

DETAILED DESCRIPTION

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Problem Formulation

We begin by first considering the MIMO discrete-time system $$x(k+1)=Ax(k)+Bu(k)+D_1 w(k), \quad (1)$$

$$y(k)=Cx(k)+D_2 w(k), \quad (2)$$

$$z(k)=E_1 x(k)+E_0 w(k), \quad (3)$$

where $x(k) \in \mathbb{R}^n$, $y(k) \in \mathbb{R}^{l_y}$, $z(k) \in \mathbb{R}^{l_z}$, $u(k) \in \mathbb{R}^{l_u}$, $w(k) \in \mathbb{R}^{l_w}$, and $k \geq 0$. Our goal is to develop an adaptive output feedback controller under which the performance variable z is minimized in the presence of the exogenous signal w. In (1)-(3), w can represent either a command signal to be followed, an external disturbance to be rejected, or both. For example, if $D_1$=0 and $E_o \neq 0$, then the objective is to have the output $E_1 x$ follow the command signal $-E_0 w$. On the other hand, if $D_1 \neq 0$ and $E_o$=0, then the objective is to reject the disturbance w from the performance variable $E_1 x$. The combined command-following and disturbance-rejection problem is addressed when $D_1$ and $E_0$ are suitably partitioned matrices. More precisely, if $D_1 = [D_{11} 0]$, $E_0 = [0 E_{02}]$, and $$w(k) = \begin{bmatrix} w_1(k) \\ w_2(k) \end{bmatrix},$$

then the objective is to have $E_1 x$ follow the command $-E_{02} w_2$ while rejecting the disturbance $D_{11} w_1$. Lastly, if $D_1$ and $E_0$ are zero matrices, then the objective is output stabilization, that is, convergence of z to zero. We assume that (A, B) is stabilizable, and (A, C) and (A, $E_1$) are detectable, and that measurements of y and z are available for feedback. If the command signal is included as a component of y, then the adaptive controller has a feedforward architecture. For disturbance-rejection problems, the controller does not require measurements of the external disturbance w.

ARMAX Modeling

Consider the ARMAX representation of (1), (3), given by $$z(k) = \sum_{i=1}^{n} -\alpha_i z(k-i) + \sum_{i=1}^{n} \beta_i u(k-i) + \sum_{i=0}^{n} \gamma_i w(k-i), \quad (4)$$

where $\alpha_1, \ldots, \alpha_n \in \mathbb{R}$, $\beta_1, \ldots, \beta_n \in \mathbb{R}^{l_z \times l_u}$, and $\gamma_0, \ldots, \gamma_n \in \mathbb{R}^{l_z \times l_w}$. We define the relative degree $d \geq 1$ as the smallest positive integer i such that the ith Markov parameter $$H_i \triangleq E_1 A^{i-1} B \in \mathbb{R}^{l_z \times l_u}$$

is nonzero. Note that, if d=1, then $H_1 = \beta_1$, whereas, if $d \geq 2$, then $\beta_1 = \ldots = \beta_{d-1} = H_1 = \ldots = H_{d-1} = 0$ and $H_d = \beta_d$.

Letting the data window size p be a positive integer, we define the extended performance vector $Z(k) \in \mathbb{R}^{pl_z}$ and $U_1(k) \in \mathbb{R}^{q_c l_u}$ by $$Z(k) \triangleq \begin{bmatrix} z(k) \\ \vdots \\ z(k-p+1) \end{bmatrix}, \quad U_1(k) \triangleq \begin{bmatrix} u(k-1) \\ \vdots \\ u(k-q_c) \end{bmatrix}, \quad (5)$$

where $$q_c \triangleq n + p - 1.$$

The data window size p has a small but noticeable effect on transient behavior. Now, (4) can be written in the form $$Z(k) = W_{zw}\phi_{zw}(k) + B_{zu}U_1(k), \quad (6)$$

where $W_{zw} \in \mathbb{R}^{pl_z \times [q_c l_z + (q_c+1)l_w]}$, $B_{zu} \in \mathbb{R}^{pl_z \times q_c l_u}$, and $\phi_{zw} \in \mathbb{R}^{q_c l_z + (q_c+1)l_w}$ are given by $$W_{zw} \triangleq \begin{bmatrix} -\alpha_1 I_{l_z} & \cdots & -\alpha_n I_{l_z} & 0_{l_z \times l_z} & \cdots & 0_{l_z \times l_z} & \gamma_0 & \cdots & \gamma_n & 0_{l_z \times l_w} & \cdots & 0_{l_z \times l_w} \\ 0_{l_z \times l_z} & \ddots & & & \ddots & \vdots & 0_{l_z \times l_w} & \ddots & & & \ddots & \vdots \\ \vdots & \ddots & \ddots & & & 0_{l_z \times l_z} & \vdots & \ddots & \ddots & & & 0_{l_z \times l_w} \\ 0_{l_z \times l_z} & \cdots & 0_{l_z \times l_z} & -\alpha_1 I_{l_z} & \cdots & -\alpha_n I_{l_z} & 0_{l_z \times l_w} & \cdots & 0_{l_z \times l_w} & \gamma_0 & \cdots & \gamma_n \end{bmatrix}, \quad (7)$$

$$B_{zu} \triangleq \begin{bmatrix} \beta_1 & \cdots & \beta_n & 0_{l_z \times l_u} & \cdots & 0_{l_z \times l_u} \\ 0_{l_z \times l_u} & \ddots & & \ddots & \ddots & \vdots \\ \vdots & \ddots & \ddots & & \ddots & 0_{l_z \times l_u} \\ 0_{l_z \times l_u} & \cdots & 0_{l_z \times l_u} & \beta_1 & \cdots & \beta_n \end{bmatrix}, \quad (8)$$

and $$\phi_{zw}(k) \triangleq \begin{bmatrix} z(k-1) \\ \vdots \\ z(k-p-n+1) \\ w(k) \\ \vdots \\ w(k-p-n+1) \end{bmatrix}. \quad (9)$$

Note that $W_{zw}$ includes modeling information about the plant poles and exogenous input path, whereas $B_{zu}$ includes modeling information about the plant zeros. Both $W_{zw}$ and $B_{zu}$ have block-Toeplitz structure.

Controller Construction

To formulate an adaptive control algorithm for (1)-(3), we use a strictly proper time-series controller of order $n_c$ such that the control u(k) is given by $$u(k) = \sum_{i=1}^{n_c} P_i(k)u(k-i) + \sum_{i=1}^{n_c} Q_i(k)y(k-i), \quad (10)$$

where, for all $i=1, \ldots, n_c$, $P_i(k) \in \mathbb{R}^{l_u \times l_u}$ and $Q_i(k) \in \mathbb{R}^{l_u \times l_y}$. The controller order $n_c$ is determined by standard control guidelines in terms of stabilization and disturbance rejection. The control (10) can be expressed as $$u(k) = \theta(k)\phi(k), \quad (11)$$

where $$\theta(k) \triangleq [Q_1(k) \ \ldots \ Q_{n_c}(k) \ P_1(k) \ \ldots \ P_{n_c}(k)] \in \mathbb{R}^{l_u \times n_c(l_u+l_y)} \quad (12)$$

is the controller gain matrix, and the regressor vector $\phi(k)$ is given by $$\phi(k) \triangleq \begin{bmatrix} y(k-1) \\ \vdots \\ y(k-n_c) \\ u(k-1) \\ \vdots \\ u(k-n_c) \end{bmatrix} \in \mathbb{R}^{n_c(l_u+l_y)}. \quad (13)$$

We define the extended control vector $U(k) \in \mathbb{R}^{p_c l_u}$ by $$U(k) \triangleq \begin{bmatrix} u(k-1) \\ \vdots \\ u(k-p_c) \end{bmatrix}, \quad (14)$$

where $p_c \geq q_c$. Note that, if $p_c = q_c$, then $U(k) = U_1(k)$. From (11), it follows that the extended control vector $U(k)$ can be written as $$U(k) = \sum_{i=1}^{p_c} L_i \theta(k-i)\phi(k-i), \quad (15)$$

where $$L_i \triangleq \begin{bmatrix} 0_{(i-1)l_u \times l_u} \\ I_{l_u} \\ 0_{(p_c-i)l_u \times l_u} \end{bmatrix} \in \mathbb{R}^{p_c l_u + l_u}. \quad (16)$$

Next, we define the retrospective performance vector $\hat{Z}(\hat{\theta}, k) \in \mathbb{R}^{pl_z}$ by $$\hat{Z}(\hat{\theta}, k) \triangleq W_{zw}\phi_{zw}(k) + B_{zu}U_1(k) - \overline{B}_{zu}[U(k) - \hat{U}(\hat{\theta}, k)], \quad (17)$$

where $\hat{\theta} \in \mathbb{R}^{l_u \times n_c(l_u+l_y)}$ is the surrogate controller gain matrix, $\overline{B}_{zu} \in \mathbb{R}^{pl_z \times p_c l_u}$ is the surrogate input matrix, and $$\hat{U}(\hat{\theta},k) \triangleq \sum_{i=1}^{p_c} L_i \hat{\theta} \phi(k-i) \quad (18)$$

is the recomputed extended control vector. Substituting (6) into (17) yields $$\hat{Z}(\hat{\theta},k) = Z(k) - \bar{B}_{zu}[U(k) - \hat{U}(\hat{\theta},k)]. \quad (19)$$

Note that the expression for $\hat{Z}(\hat{\theta},k)$ given by (19) does not depend on either the exogenous signal w or the matrix $W_{zw}$, which includes information about the open-loop poles as well as the transfer function from w to z. Hence, we do not need to know this model data, and, when w represents a disturbance, we do not need to assume that w is known. However, when w represents a command, then w can be viewed as an additional measurement y, and thus the controller has feedforward action. The matrix $\bar{B}_{zu}$ is discussed further below.

Note that (19) can be rewritten as $$\hat{Z}(\hat{\theta},k) = f(k) + D(k)\text{vec}\hat{\theta}, \quad (20)$$

where $$f(k) \triangleq Z(k) - \bar{B}_{zu} U(k) \in \mathbb{R}^{pl_z}, \quad (21)$$

$$D(k) \triangleq \sum_{i=1}^{p_c} \phi^T(k-i) \otimes (\bar{B}_{zu} L)_i \in \mathbb{R}^{pl_z \times n_c l_u(l_u+l_y)} \quad (22)$$

vec is the column-stacking operator, and ⊗ represents the Kronecker product.

Now, consider the retrospective cost function $$J(\hat{\theta},k) \triangleq \hat{Z}^T(\hat{\theta},k) R_1(k) \hat{Z}(\hat{\theta},k) + 2\hat{Z}^T(\hat{\theta},k) R_{12}(k) \hat{u}(\hat{\theta},k+1) + \hat{u}^T(\hat{\theta},k+1) R_2(k) \hat{u}(\hat{\theta},k+1) + tr\left[R_3(k)(\hat{\theta}-\theta(k))^T R_4(k)(\hat{\theta}-\theta(k))\right] \quad (23)$$

where $R_1(k) \in \mathbb{R}^{pl_z \times pl_z}$, $R_{12}(k) \in \mathbb{R}^{pl_z \times l_u}$, $R_2(k) \in \mathbb{R}^{l_u \times l_u}$, $R_3(k) \in \mathbb{R}^{n_c(l_u+l_y) \times n_c(l_u+l_y)}$, $R_4(k) \in \mathbb{R}^{l_u \times l_u}$, $$\begin{bmatrix} R_1(k) & R_{12}(k) \\ R_{12}^T(k) & R_2(k) \end{bmatrix}$$

is positive semidefinite, $R_3(k)$ and $R_4(k)$ are positive definite, and $$\hat{u}(\hat{\theta},k) \triangleq \hat{\theta}\phi(k). \quad (24)$$

Substituting (20) into (23) yields $$J(\hat{\theta},k) = (\text{vec}\hat{\theta})^T M(k)\text{vec}\hat{\theta} + b^T(k)\text{vec}\hat{\theta} + c(k) \quad (25)$$

where $$M(k) \triangleq D^T(k) R_1(k) D(k) + 2D^T(k)[\phi^T(k) \otimes R_{12}(k)] + [\phi(k)\phi^T(k)] \otimes R_2(k) + R_3(k) \otimes R_4(k) \quad (26)$$

$$b(k) \triangleq 2D^T(k) R_1(k) f(k) + 2[\phi(k) \otimes R_{12}^T(k)] f(k) - 2[R_3(k) \otimes R_4(k)]\text{vec}\theta(k) \quad (27)$$

$$c(k) \triangleq f^T(k) R_1(k) f(k) + tr[R_3(k)\theta^T(k) R_4(k) \theta(k)] \quad (28)$$

Since $M(k)$ is positive definite, $J(\hat{\theta},k)$ has the strict global minimizer $\theta(k+1)$ given by $$\theta(k+1) = -\frac{1}{2}\text{vec}^{-1}[M^{-1}(k) b(k)] \quad (29)$$

Equation (29) is the adaptive control update law. Note that $\bar{B}_{zu}$ (which appears in f(k) and D(k)) must be specified in order to implement (29). Furthermore, (29) requires the on-line inversion of a positive-definite matrix of size $n_c l_u(l_u+l_y) \times n_c l_u(l_u+l_y)$.

In the special case $$R_1(k) \triangleq I_{pl_z}, \quad R_{12}(k) \triangleq 0_{pl_z \times l_u}, \quad R_2(k) \triangleq 0_{l_u \times l_u}, \quad (30)$$

$$R_3(k) \triangleq \alpha(k) I_{n_c(l_u+l_y)}, \quad R_4(k) \triangleq I_{l_u}, \quad (31)$$

where $\alpha(k) > 0$ is a scalar, (26)-(28) become $$M(k) = D^T(k) D(k) + \alpha(k) I_{n_c l_u(l_u+l_y)}, \quad (32)$$

$$b(k) = 2D^T(k) f(k) - 2\alpha(k)\text{vec}\theta(k), \quad (33)$$

$$c(k) = f^T(k) f(k) + \alpha(k) tr[\theta^T(k) \theta(k)] \quad (34)$$

Using the matrix inversion lemma it follows that $$M^{-1}(k) = \alpha^{-1}(k) I_{n_c l_u(l_u+l_y)} - \alpha^{-1}(k) D^T(k)[\alpha(k) I_{pl_z} + D(k) D^T(k)]^{-1} D(k). \quad (35)$$

Consequently, in this case, the update law (29) requires the on-line inversion of a positive-definite matrix of size $pl_z \times pl_z$. We use the weightings (30), (31) for all of the examples in the present application. The weighting parameter $\alpha(k)$ introduced in (31) is called the learning rate since it affects the convergence speed of the adaptive control algorithm. As $\alpha(k)$ is increased, a higher weight is placed on the difference between the previous controller coefficients and the updated controller coefficients, and, as a result, convergence speed is lowered. Likewise, as $\alpha(k)$ is decreased, convergence speed is raised. By varying $\alpha(k)$, we can effect tradeoffs between transient performance and convergence speed.

We define the retrospective performance variable $\hat{z} \in \mathbb{R}^{l_z}$ by $$\hat{z}(k) \triangleq [I_{l_z} \; 0_{l_z \times l_z} \; \ldots \; 0_{l_z \times l_z}]\hat{Z}(\theta(k),k). \quad (36)$$

In the particular case z=y, using $\hat{z}$ in place of y in the regressor vector (13) yields faster convergence. Therefore, for z=y, we redefine (13) as $$\phi(k) \triangleq \begin{bmatrix} \hat{z}(k-1) \\ \vdots \\ \hat{z}(k-n_c) \\ u(k-1) \\ \vdots \\ u(k-n_c) \end{bmatrix}. \quad (37)$$

Figure 1:
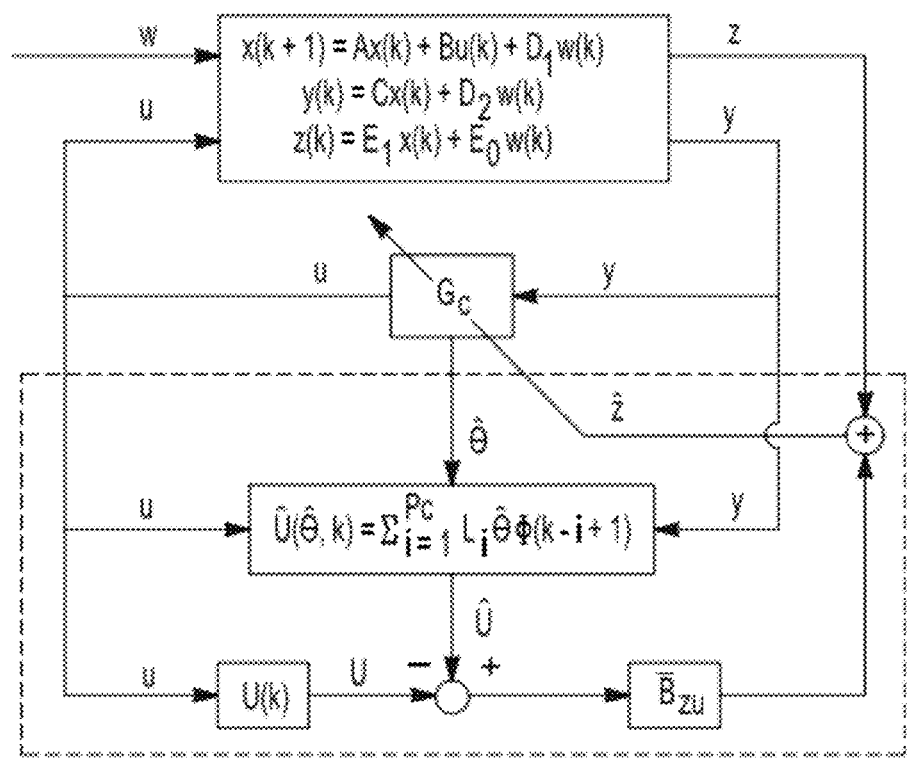

The novel feature of the adaptive control algorithm given by (11) and (29) is the use of the retrospective correction filter (RCF) (19), as shown in FIG. 1 for p=1. RCF provides an inner loop to the adaptive control law by modifying the extended performance vector Z(k) in terms of the difference between the actual past control inputs U(k) and the recomputed control inputs $\hat{U}(\hat{\theta},k)$.

Markov-Parameter Polynomial

By recursively substituting (1) into (3), it follows that z(k) can be represented by $$z(k)=E_1A^r x(k-r)+H_1 u(k-1)+H_2 u(k-2)+\ldots+H_r u(k-r)+H_{zw,0}w(k)+H_{zw,1}w(k-1)+\ldots+H_{zw,r}w(k-r), \quad (38)$$

where $r \geq d$, $H_{zw,0} \triangleq E_0$, and, for all $i>0$, $H_{zw,i} \triangleq E_1 A^{i-1} D_1$. In terms of the backward-shift operator $q^{-1}$, (38) can be rewritten as $$z(k)=E_1 A^r q^{-r} x(k)+[H_1 q^{-1}+H_2 q^{-2}+\ldots+H_r q^{-r}]u(k)+[H_{zw,0}+H_{zw,1}q^{-1}+\ldots+H_{zw,r}q^{-r}]w(k) \quad (39)$$

Shifting (39) forward by r steps gives $$z(k+r)=E_1 A^r x(k)+p_r(q)u(k)+W_r(q)w(k), \quad (40)$$

where q is the forward-shift operator, $$W_r(q) \triangleq H_{zw,0}q^r+H_{zw,1}q^{r-1}+H_{zw,2}q^{r-2}+\ldots+H_{zw,r}, \quad (41)$$

and $$p_r(q) \triangleq H_1 q^{r-1}+H_2 q^{r-2}+\ldots+H_r. \quad (42)$$

We call $p_r(q)$ the Markov-parameter polynomial. Note that $p_r(q)$ is a matrix polynomial in the MIMO case and a polynomial in the SISO case. Furthermore, since $H_1=\ldots=H_{d-1}=0$ when $d \geq 2$, it follows that, for all $r \geq d \geq 1$, $p_r(q)$ can be written as $$p_r(q)=H_d q^{r-d}+H_{d+1}q^{r-d-1}+\ldots+H_r. \quad (43)$$

The Markov-parameter polynomial $p_r(q)$ contains information about the relative degree d and, in the SISO case, the sign of the high-frequency gain, that is, the sign of $H_d$. We show below that $p_r(q)$ also contains information about the transmission zeros of $G_{zu}(z) \triangleq E_1(zI-A)^{-1}B$, which is given by $$G_{zu}(z) = \frac{1}{z^n+\alpha_1 z^{n-1}+\ldots+\alpha_n}(\beta_1 z^{n-1}+\beta_2 z^{n-2}+\ldots+\beta_n) \quad (44)$$

In order to relate the transmission zeros of $G_{zu}$ to $p_r(q)$, the Laurent series expansion of $G_{zu}$ about $z=\infty$ is given by $$G_{zu}(z) = \sum_{i=1}^{\infty} z^{-i} H_i. \quad (45)$$

This expansion converges uniformly on all compact subsets of $\{z:|z|>\rho(A)\}$, where $\rho(A)$ is the spectral radius of A. By truncating the summation in (45), we obtain the truncated Laurent expansion $\overline{G}_{r,zu}$ of $G_{zu}$, given by $$\overline{G}_{r,zu}(z) \triangleq \sum_{i=1}^{r} z^{-i} H_i \quad (46)$$

$$= \frac{1}{z^r}(H_1 z^{r-1}+\ldots+H_{r-1}z+H_r)$$

$$= \frac{1}{z^r} p_r(z)$$

Consequently, the Markov-parameter polynomial $p_r(q)$ is closely related to the truncated Laurent expansion of $G_{zu}$.

Approximation of Outer Nonminimum-Phase Zeros

In the case of MIMO systems, $p_r(q)$ is a matrix polynomial and thus does not have roots in the sense of a polynomial. We therefore require the notion of a Smith zero. Specifically, $z \in \mathbb{C}$ is a Smith zero of $p_r(q)$ if the rank of $p_r(z)$ is less than the normal rank of $p_r(q)$, that is, the maximum rank of $p_r(\xi)$ taken over all $\xi \in \mathbb{C}$.

Definition 5.1—Let $\xi \in \mathbb{C}$ be a transmission zero of $G_{zu}$. Then, $\xi$ is an outer zero of $G_{zu}$ if $|\xi| \geq \rho(A)$. Otherwise, $\xi$ is an inner zero of $G_{zu}$.

The following result shows that the Smith zeros of the Markov-parameter polynomial $p_r(q)$ asymptotically approximate each outer transmission zero of $G_{zu}$.

Fact 5.1—Let $\xi \in \mathbb{C}$ be an outer transmission zero of $G_{zu}$. For each r, let $\mathfrak{R}_r \triangleq \{\xi_{r,1}, \ldots, \xi_{r,m_r}\}$ denote the set of Smith zeros of $p_r(q)$. Then, there exists a sequence $\{\xi_{r,i_r}\}_{r=1}^{\infty}$ that converges to $\xi$ as $r \to \infty$.

The following specialization to SISO transfer functions shows that the roots of $p_r(q)$ asymptotically approximate each outer zero of $G_{zu}$.

Fact 5.2 Consider $1_u = 1_z = 1$, and let $\xi \in \mathbb{C}$ be an outer zero of $G_{zu}$. For each r, let $\mathfrak{R}_r \triangleq \{\xi_{r,1}, \ldots, \xi_{r,r-d}\}$ be the set of roots of $p_r(q)$. Then, there exists a sequence $\{\xi_{r,i_r}\}_{r=1}^{\infty}$ that converges to $\xi$ as $r \to \infty$.

The following examples illustrate Fact 5.2 by showing that, as r increases, roots of the Markov-parameter polynomial $p_r(q)$, and hence, roots of the numerator of the truncated transfer function $\overline{G}_{r,zu}$, asymptotically approximate each outer nonminimum-phase zero of $F_{zu}$. The remaining roots of $p_r(q)$ are either located at the origin or form an approximate ring with radius close to $\rho(A)$. These roots are spurious and have no effect on the adaptive control algorithm.

Figure 2:
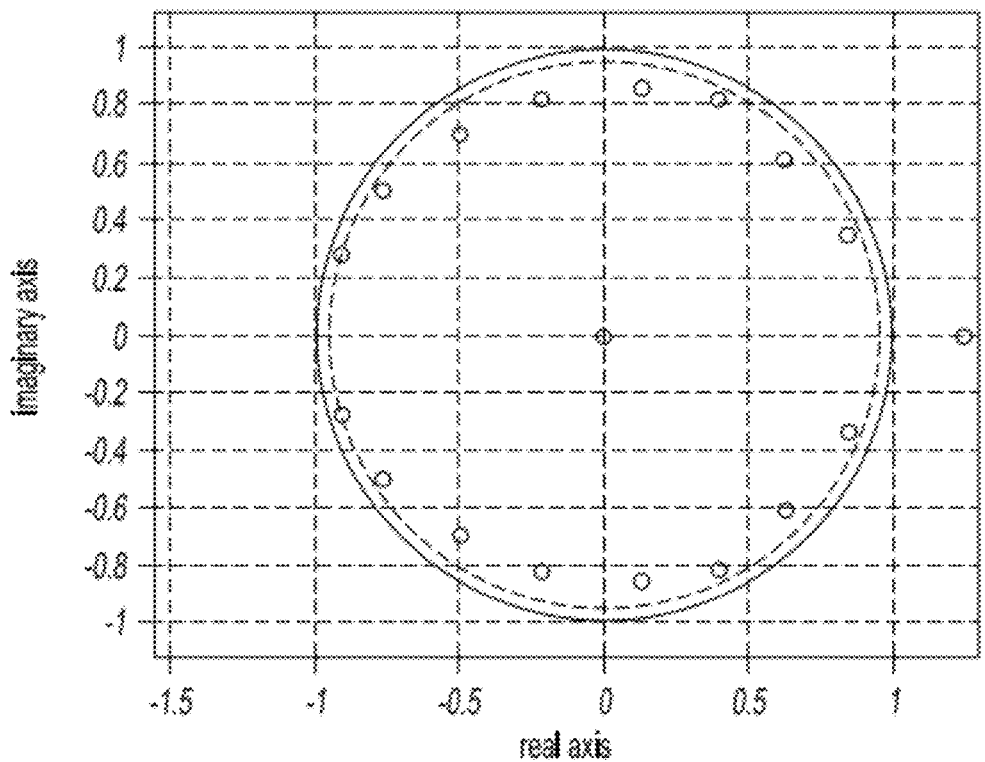

Example 5.1 (SISO, nonminimum-phase, stable plant). Consider the plant $G_{zu}$ with d=2, $H_2=1$, poles $0.5 \pm 0.5$ j, $-0.5 \pm 0.5$ j, $\pm 0.95$, $\pm 0.7$ j, minimum-phase zeros $0.3 \pm 0.7$ j, $-0.7 \pm 0.3$ j, and outer nonminimum-phase zeros 1.25, −1.5. Table 1 lists the approximated nonminimum-phase zeros obtained as roots of $p_r(q)$ as a function of r. Note that as r increases, the outer nonminimum-phase zeros are more closely approximated by the roots of $p_r(q)$. See FIG. 2.

TABLE 1

Approximated nonminimum-phase zeros obtained as roots of $p_r(q)$ as a function of r for the stable, nonminimum-phase plant in Example 5.1. As r increases, the outer zeros are more accurately modeled.

| r | roots$_{nmp}$ ($p_r(q)$) |
| --- | --- |
| 6 | {0.944, −1.537} |
| 8 | {1.170, −1.502} |
| 10 | {1.207, −1.498} |
| 15 | {1.240, −1.499} |
| 20 | {1.248, −1.500} |
| 25 | {1.250, −1.500} |

Figure 3:
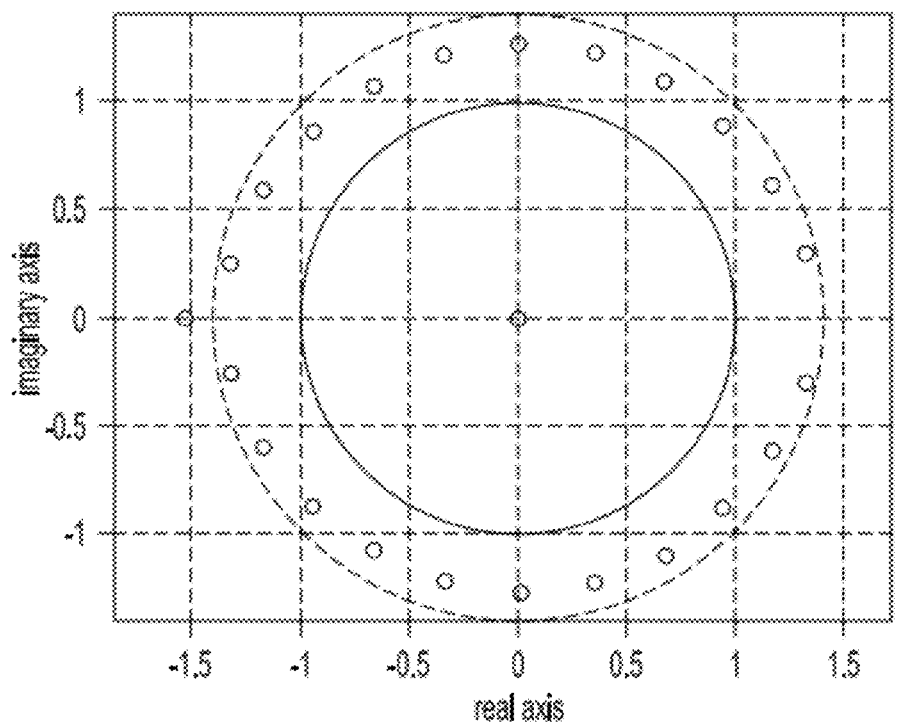

Example 5.2 (SISO, nonminimum-phase, unstable plant). Consider the plant $G_{zu}$ with d=2, $H_2$=1, poles 0.5±0.5 j, −0.5±0.5 j, ±0.7 j, −0.95, 1.4 minimum-phase zeros 0.3±0.7 j, −0.7±0.3 j, outer nonminimum-phase zero −1.5, and inner nonminimum-phase zero 1.25. FIG. 3 shows the roots of $p_{25}(q)$. Note that the root of $p_{25}(q)$ outside $\rho(A)$ is close to the outer nonminimum-phase zero −1.5. However, the inner nonminimum-phase zero 1.25 is not approximated by a root of $p_{25}(q)$. The remaining roots are either located at the origin or form an approximate ring with radius close to $\rho(A)$.

Approximation of Inner Nonminimum-Phase Zeros

Example 5.2 illustrates that the roots of $p_r(q)$ approximate each outer nonminimum-phase zero of $G_{zu}$. However, inner nonminimum-phase zeros of $G_{zu}$ are not approximated by roots of $p_r(q)$. To overcome this deficiency, we can use information about the plant's unstable poles to create a modified Markov-parameter polynomial $\tilde{p}_r(q)$ whose roots approximate each nonminimum-phase zero of $G_{zu}$. For illustration, assume that the SISO plant $G_{zu}$ has a unique unstable pole $\zeta \in \mathbb{C}$ whose absolute value is greater than all other poles of $G_{zu}$. Then, we define $$\tilde{G}_{zu}(z) \triangleq \frac{z-\zeta}{z} G_{zu}(z) \qquad (47)$$

$$= G_{zu}(z) - \frac{\zeta}{z} G_{zu}(z)$$

$$= \sum_{i=d}^{\infty} z^{-i} H_i - \sum_{i=d}^{\infty} z^{-(i+1)} \zeta H_i$$

$$= \sum_{i=d}^{\infty} z^{-i} [H_i - \zeta H_{i-1}]$$

-continued $$= \sum_{i=d}^{\infty} z^{-i} \tilde{H}_i$$

where, for i=1, 2, ..., $\tilde{H}_i \triangleq H_i - \zeta H_{i-1}$ are the modified Markov parameters, and $H_0$=0. By repeating this operation for each unstable pole of $G_{zu}$, the roots of the modified Markov-parameter polynomial $$\tilde{p}_r(q) \triangleq \tilde{H}_d q^{r-d} + \tilde{H}_{d+1} q^{r-d-1} + \ldots + \tilde{H}_r \qquad (48)$$

can approximate each nonminimum-phase zero of $G_{zu}$. The following example illustrates this process.

Figure 4:
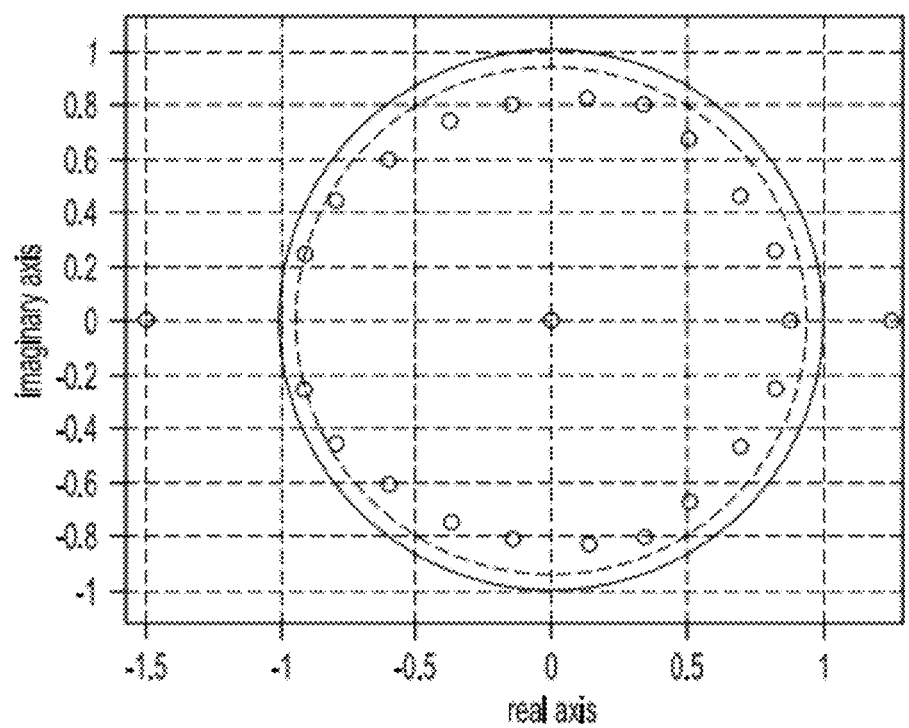

Example 5.3 (Ex. 5.2 with pole information) Reconsider Example 5.2, where the inner nonminimum-phase zero 1.25 is not approximated by a root of $p_r(q)$. Using knowledge of the unstable pole 1.4 to construct $\tilde{p}_r(q)$ given by (48), FIG. 4 shows the roots of $\tilde{p}_{25}(q)$. Note that the roots outside $\rho(\tilde{A})$, where $\tilde{A}$ is the dynamics matrix of a minimal realization of $G_{zu}$, are close to the nonminimum-phase zeros of $G_{zu}$. The remaining roots are either located at the origin or form an approximate ring with radius close to $\rho(\tilde{A})$.

Construction of $\overline{B}_{zu}$

We present four constructions for $\overline{B}_{zu}$ based on the available modeling information.

$B_{zu}$-Based Construction

If $B_{zu}$ given by (8) is known, then, with $p_c=q_c$, $\overline{B}_{zu}$ can be chosen to be equal to $B_{zu}$. In this case, $U(k)=U_1(k)$, and (17) becomes $$\hat{Z}(\hat{\theta},k) = W_{zw} \phi_{zw}(k) + B_{zu} \hat{U}(\hat{\theta},k). \qquad (49)$$

This construction of $\overline{B}_{zu}$ captures information about the relative degree d, the first nonzero Markov parameter (since $H_d = \beta_d$), and exact values of all transmission zeros of $G_{zu}$, that is, both minimum-phase and nonminimum-phase transmission zeros.

Nonminimum-Phase-Zero-Based Construction

Consider $l_u=l_z=1$ and assume that $H_d$ and the nonminimum-phase zeros of $G_{zu}$ are known. Then we define the nonminimum-phase-zero polynomial N(q) to be the polynomial whose roots are equal to the nonminimum-phase zeros of $G_{zu}$, that is, $$N(q) \triangleq H_d q^m + \tilde{\beta}_1 q^{m-1} + \ldots + \tilde{\beta}_m, \qquad (50)$$

where m≥0 is the number of nonminimum-phase zeros in $G_{zu}$, and $\tilde{\beta}_1, \ldots, \tilde{\beta}_m \in \mathbb{R}$. If m=0, that is, $G_{zu}$ is minimum phase, then N(q)=$H_d$. With $p_c=q_c$, the nonminimum-phase-zero-based construction of $\overline{B}_{zu}$ is thus given by $$\overline{B}_{zu} = \begin{bmatrix} H_1 & \ldots & H_d & \tilde{\beta}_1 & \ldots & \tilde{\beta}_m & 0_{l_z \times l_u} & \ldots & 0_{l_z \times l_u} & 0_{l_z \times l_u} & \ldots & 0_{l_z \times l_u} \\ 0_{l_z \times l_u} & \ddots & & \ddots & \ddots & & \ddots & \ddots & & \ddots & \ddots & \vdots \\ \vdots & \ddots & \ddots & & \ddots & \ddots & & \ddots & \ddots & & \ddots & \vdots \\ 0_{l_z \times l_u} & \ldots & 0_{l_z \times l_u} & H_1 & \ldots & H_d & \tilde{\beta}_1 & \ldots & \tilde{\beta}_m & 0_{l_z \times l_u} & \ldots & 0_{l_z \times l_u} \end{bmatrix}, \qquad (51)$$

where $H_1 = \ldots = H_{d-1} = 0$. This construction of $\overline{B}_{zu}$ captures information about the relative degree d, the first nonzero Markov parameter, and exact values of all nonminimum-phase zeros of $G_{zu}$. In the minimum-phase case, the only required modeling information is $H_d$. This construction of $\overline{B}_{zu}$ can be extended to the MIMO case by replacing each minimum-phase zero in the Smith-McMillan form of $G_{zu}$ by a zero at z=0.

r-MARKOV-Based Construction

Replacing k with k−1 in (4) and substituting the resulting relation back into (4) yields a 2-MARKOV model. Repeating this procedure r−1 times yields the r-MARKOV model of (1)-(3)

$$z(k) = \sum_{i=1}^{n} \alpha_{r,i} z(k-r-i+1) + \qquad (52)$$

$$\sum_{i=d}^{r-1} H_i u(k-i) + \sum_{i=1}^{n} \beta_{r,i} u(k-r-i+1) +$$

$$\sum_{i=0}^{r-1} H_{zw,i} w(k-i) + \sum_{i=1}^{n} \gamma_{r,i} w(k-r-i+1),$$

where, for i=1, ..., n, the coefficients $\alpha_{r,i} \in \mathbb{R}$, $\beta_{r,i} \in \mathbb{R}^{l_z \times l_u}$, and $\gamma_{r,i} \in \mathbb{R}^{l_z \times l_w}$ are given by $$\alpha_{1,i} \triangleq -\alpha_i, \qquad \beta_{1,i} \triangleq \beta_i, \qquad \gamma_{1,i} \triangleq \gamma_i, \qquad (53)$$

$$\vdots \qquad \vdots \qquad \vdots$$

$$\alpha_{r,i} \triangleq \alpha_{r-1,1}\alpha_{1,i} + \alpha_{r-1,i+1}, \quad \beta_{r,i} \triangleq \alpha_{r-1,1}\beta_{1,i} + \beta_{r-1,i+1}, \quad \gamma_{r,i} \triangleq \alpha_{r-1,1}\gamma_{1,i} + \gamma_{r-1,i+1},$$

$$\vdots \qquad \vdots \qquad \vdots$$

$$\alpha_{r,n} \triangleq \alpha_{r-1,1}\alpha_{1,n}, \qquad \beta_{r,n} \triangleq \alpha_{r-1,1}\beta_{1,n}, \qquad \gamma_{r,n} \triangleq \alpha_{r-1,1}\gamma_{1,n}.$$

Note that $\beta_{r,1} = H_r$ and $\gamma_{r,1} = H_{zw,r}$. We represent (52) with w=0 as the r-MARKOV transfer function $$G_{r,zu}(z) = \frac{1}{z^{r+n-1} + \alpha_{r,1}z^{n-1} + \ldots + \alpha_{r,n}} \qquad (54)$$

$$(H_1 z^{r+n-2} + \ldots + H_{r-1}z^n + H_r z^{n-1} + \beta_{r,2}z^{n-2} + \ldots + \beta_{r,n})$$

The system representation (54) is nonminimal since its order is n+r−1, and thus (54) includes poles that are not present in the original model. Furthermore, note that the coefficients of the terms $z^{n+r-2}$ through $z^n$ in the denominator are zero. These facts are irrelevant for the following development. Using the numerator coefficients of (54), the r-MARKOV-based construction of $\overline{B}_{zu}$ with $p_c = q_c + r - 1$ is given by $$\overline{B}_{zu} = \begin{bmatrix} H_1 & \ldots & H_r & \beta_{r,2} & \ldots & \beta_{r,n} & 0_{l_z \times l_u} & \ldots & 0_{l_z \times l_u} \\ 0_{l_z \times l_u} & \ddots & & \ddots & \ddots & & \ddots & \ddots & \vdots \\ \vdots & \ddots & \ddots & & \ddots & \ddots & & \ddots & 0_{l_z \times l_u} \\ 0_{l_z \times l_u} & \ldots & 0_{l_z \times l_u} & H_1 & \ldots & H_r & \beta_{r,2} & \ldots & \beta_{r,n} \end{bmatrix} \qquad (55)$$

This construction of $\overline{B}_{zu}$ captures information about the relative degree d, the first nonzero Markov parameter, and exact values of all transmission zeros of $G_{zu}$, that is, both minimum-phase and nonminimum-phase transmission zeros.

Markov-Parameter-Based Construction

Using the numerator coefficients of (46), the Markov-parameter-based construction of $\overline{B}_{zu}$ with $p_c = q_c + r - 1$ is given by $$\overline{B}_{zu} = \begin{bmatrix} H_1 & \ldots & H_r & 0_{l_z \times l_u} & \ldots & 0_{l_z \times l_u} & 0_{l_z \times l_u} & \ldots & 0_{l_z \times l_u} \\ 0_{l_z \times l_u} & \ddots & & \ddots & \ddots & & \ddots & \ddots & \vdots \\ \vdots & \ddots & \ddots & & \ddots & \ddots & & \ddots & \vdots \\ 0_{l_z \times l_u} & \ldots & 0_{l_z \times l_u} & H_1 & \ldots & H_r & 0_{l_z \times l_u} & \ldots & 0_{l_z \times l_u} \end{bmatrix}. \qquad (56)$$

The Markov parameters are the numerator coefficients of a truncated Laurent series expansion of $G_{zu}$ about $z=\infty$. The Markov parameters contain information about the relative degree d and, as shown by Fact 5.2 for the SISO case, approximate values of all outer nonminimum-phase zeros of $G_{zu}$. The advantage in using $\overline{B}_{zu}$ given by (56) rather than (55) is that $\beta_{r,2}, \ldots, \beta_{r,n}$ need not be known. If, however, $G_{zu}$ has inner nonminimum-phase zeros and the unstable poles of $G_{zu}$ whose absolute values are greater than at least one inner nonminimum-phase zero are known, then we can replace the Markov parameters $H_1, \ldots, H_r$ in (56) by the modified Markov parameters $\tilde{H}_1, \ldots, \tilde{H}_r$ given in (47). If these poles are not known, then $\overline{B}_{zu}$ can be chosen to be either $B_{zu}$, the nonminimum-phase-zero form (51), or the r-MARKOV form (55).

Note that, if the order n of the system is known and 2n+1 Markov parameters are available, then a state-space model of the system can be reconstructed by using the eigensystem realization algorithm. However, the examples considered in sections below use substantially fewer Markov parameters.

NUMERICAL EXAMPLES

Nominal Cases

We now present numerical examples to illustrate the response of the RCF adaptive control algorithm under nominal conditions. We consider a sequence of examples of increasing complexity, ranging from SISO, minimum-phase plants to MIMO, nonminimum-phase plants, including stable and unstable cases. Each SISO example is constructed such that $H_d=1$. All examples assume y=z with φ(k) given by (37), and, in all simulations, the adaptive controller gain matrix θ(k) is initialized to zero. Unless otherwise noted, all examples assume x(0)=0.

Figure 5:
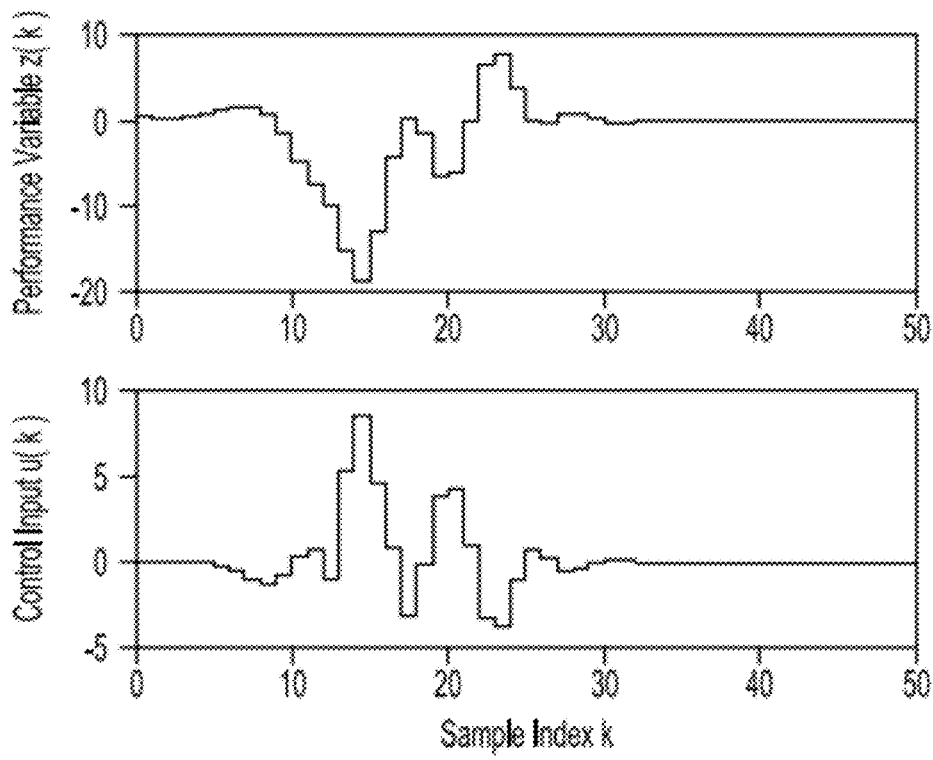

Example 7.1 (SISO, minimum-phase, unstable plant, stabilization) Consider the plant $G_{zu}$ with d=1, poles 0, 1.5, and inner nonminimum-phase zero −1.25. For stabilization, we take $D_1$ and $E_0$ to be zero matrices. Let $\overline{B}_{zu}$ be given by (51), which is constructed using the first nonzero Markov parameter $H_1=1$ and the location of the nonminimum-phase zero −1.25, that is, N(q)=q+1.25. We take $n_c=2$, p=1, and α(k)≡10. The closed-loop response is shown in FIG. 5 for x(0)=[0.1 0.4]$^T$.

Figure 6:
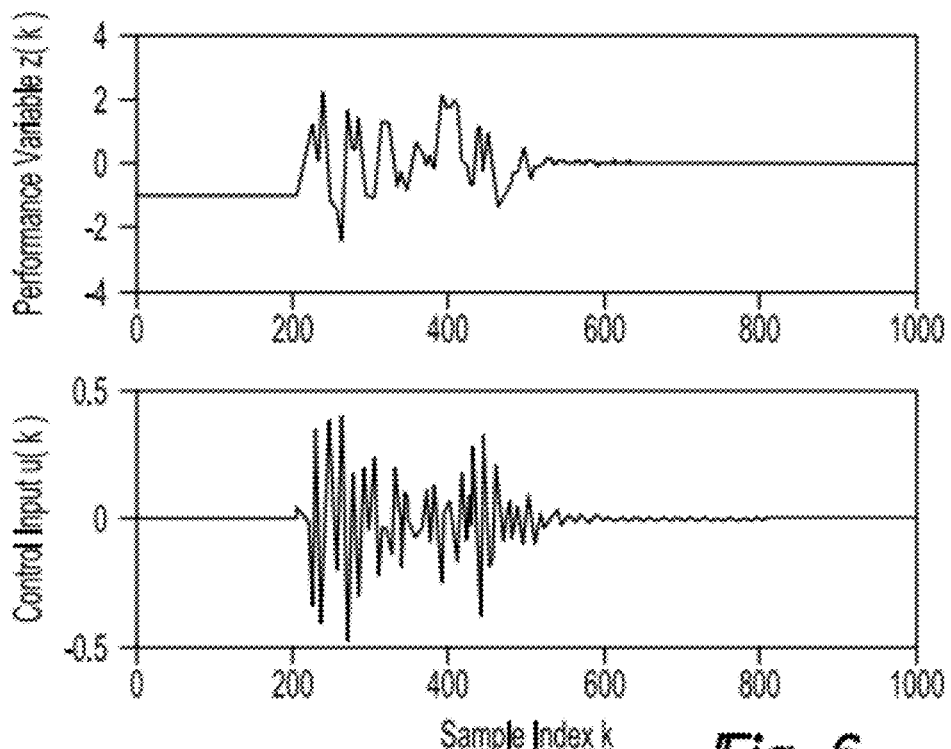

Example 7.2 (SISO, minimum-phase, unstable plant, command following). Consider the double integrator plant $G_{zu}$ with d=3, poles 0.5±0.5 j, −0.5±0.5 j, 1, 1, and a minimum-phase zeros 0.3±0.7 j, 0.5. We consider a command-following problem with step command w(k)=1. With the plant realized in controllable canonical form, we take $D_1=0$ and $E_0=-1$. We take $n_c=10$, p=5, α(k)≡5, and r=10 with $\overline{B}_{zu}$ given by (56). The closed-loop response is shown in FIG. 6.

Example 7.3 (SISO, minimum-phase, stable plant, command following and disturbance rejection). Consider the plant $G_{zu}$ with d=3, poles 0.5±0.5 j, −0.5±0.5 j, ±0.9, ±0.7 j, and minimum-phase zeros 0.3±0.7 j, 0.7±0.3 j, 0.5. We consider a combined step-command-following and disturbance-rejection problem with command $w_1$ and disturbance $w_2$ given by $$w(k) = \begin{bmatrix} w_1(k) \\ w_2(k) \end{bmatrix} = \begin{bmatrix} 5 \\ \sin\Omega_1 k \end{bmatrix}, \quad (57)$$

where $\Omega_1=\pi/10$ rad/sample. With the plant realized in controllable canonical form, we take $$D_1 = \begin{bmatrix} 0 & 0 \\ 0 & 1 \end{bmatrix} \text{ and } E_0 = [\,-1 \quad 0\,].$$

Figure 7:
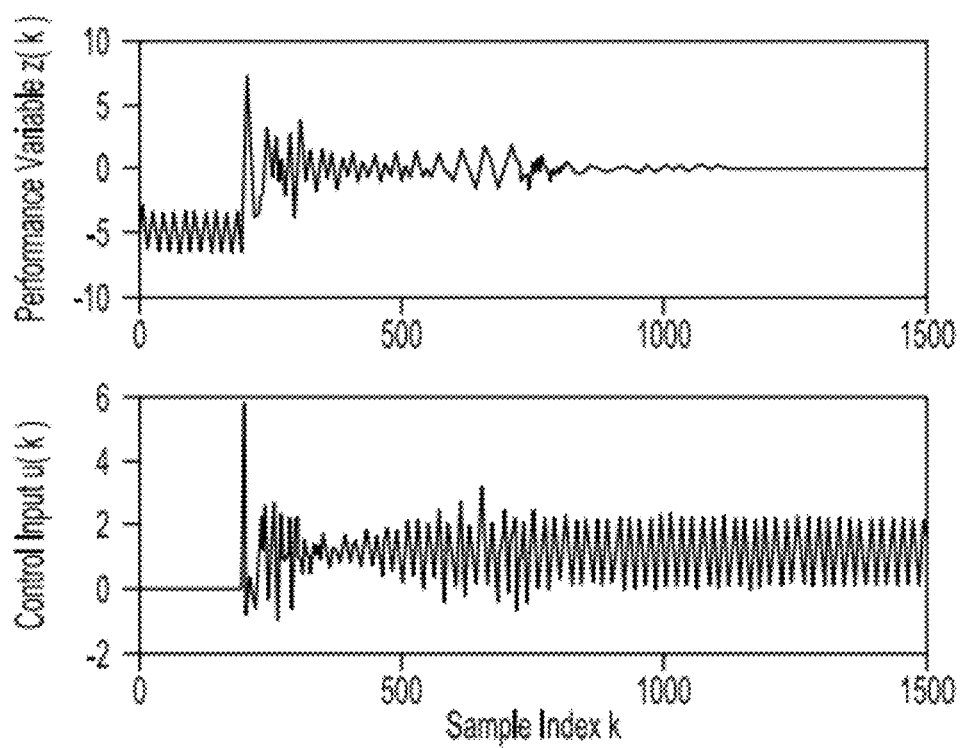

The disturbance, which is not matched, is assumed to be unknown, and the command signal is not used directly. We take $n_c=20$, $p=1$, $\alpha(k)=50$, and $r=3$ with $\overline{B}_{zu}$ given by (56). The closed-loop response is shown in FIG. 7.

The following examples are disturbance-rejection simulations, that is, $E_0=0$, with the unknown two-tone sinusoidal disturbance $$w(k) = \begin{bmatrix} \sin\Omega_1 k \\ -1.5\sin\Omega_2 k \end{bmatrix}, \quad (58)$$

where $\Omega_1=\pi/10$ rad/sample and $\Omega_2=13\pi/50$ rad/sample. With each plant realized in controllable canonical form, we take $$D_1 = \begin{bmatrix} I_2 \\ 0 \end{bmatrix},$$

and, therefore, the disturbance is not matched.

Figure 8:
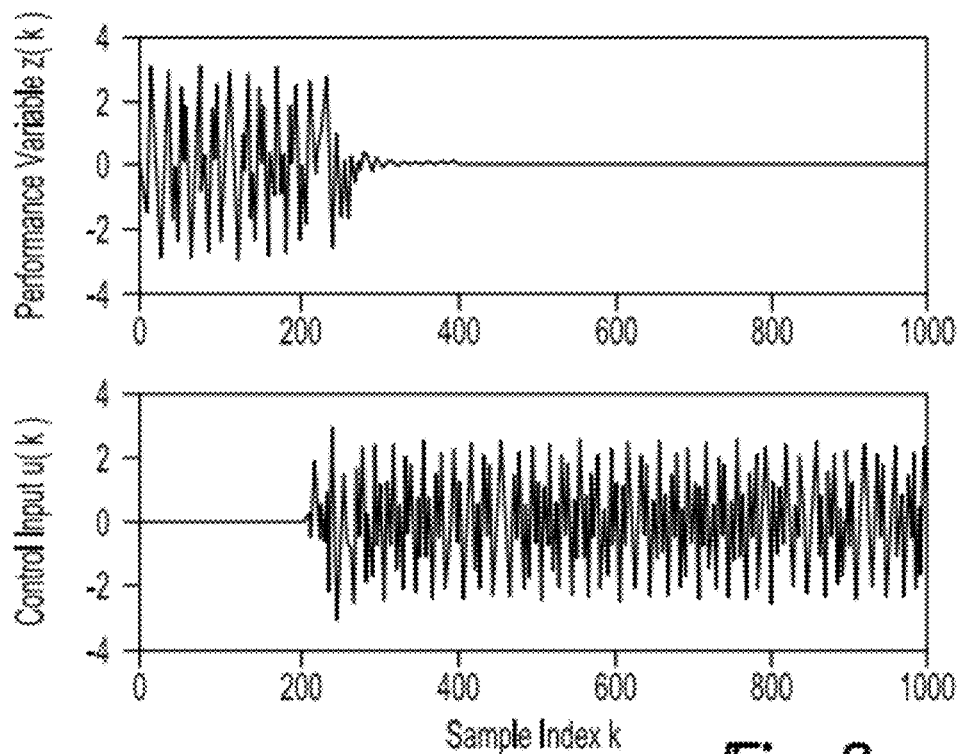
Figure 9:
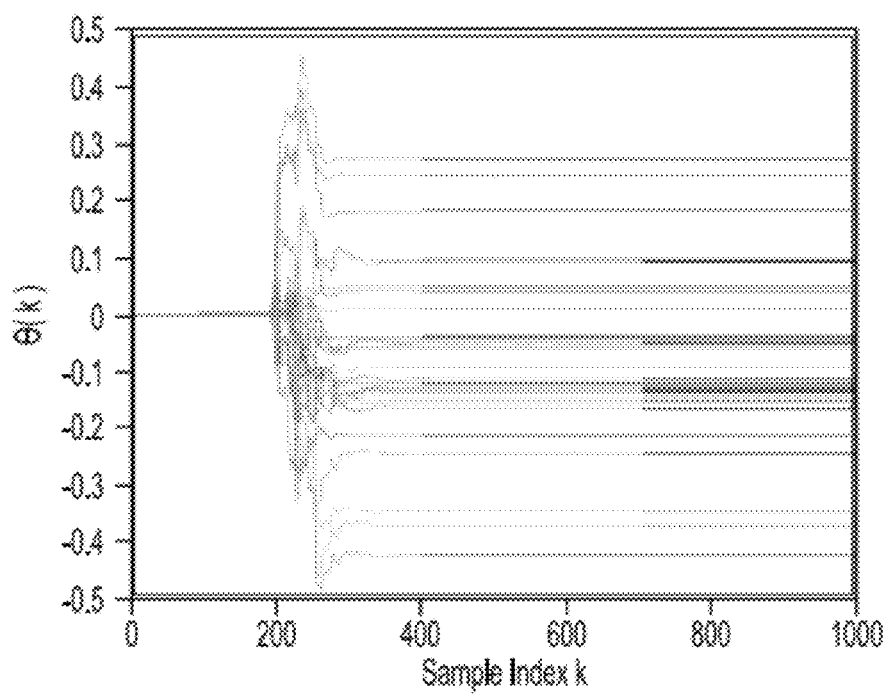
Figure 10:
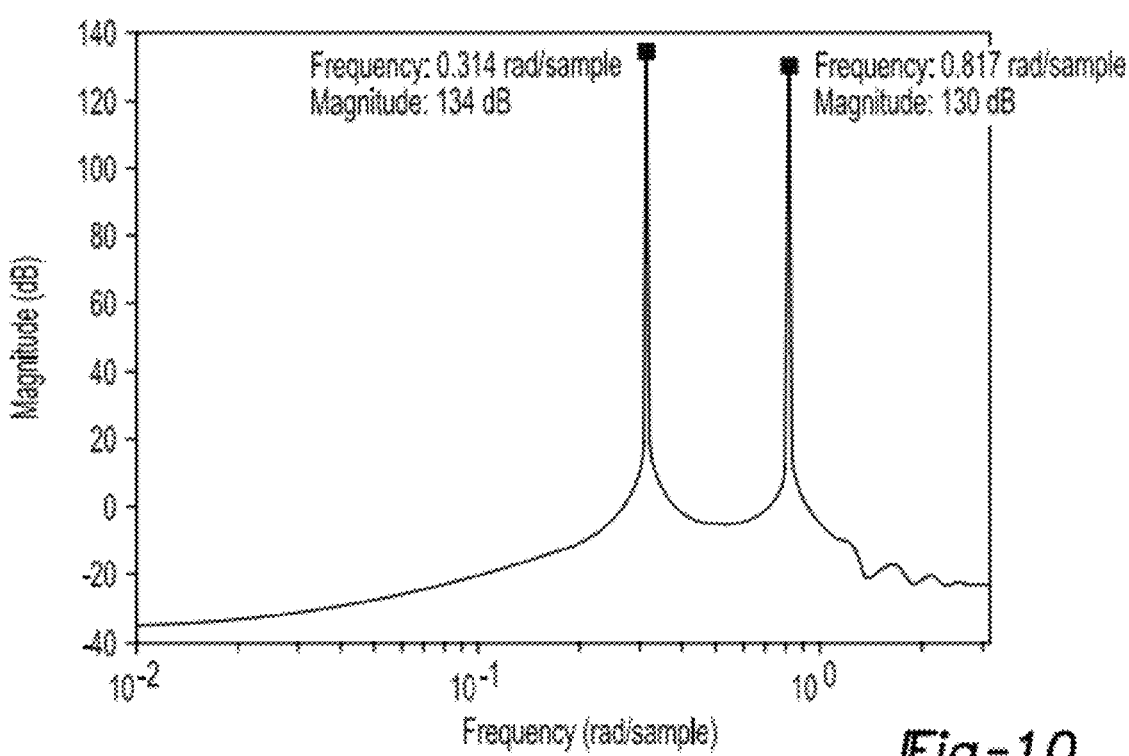

Example 7.4 (SISO, minimum-phase, stable plant, disturbance rejection) Consider the plant $G_{zu}$ with d=3, poles $0.5\pm0.5$ j, $-0.5\pm0.5$ j, $\pm0.9$, $\pm0.7$ j, and minimum-phase zeros $0.3\pm0.7$ j, $-0.7\pm0.3$ j, 0.5. Taking $n_c=15$, $p=1$, $\alpha(k)=25$, and $r=3$ with $\overline{B}_{zu}$ given by (56), the closed-loop response is shown in FIG. 8. The control algorithm converges (see FIG. 9) to an internal model controller with high gain at the disturbance frequencies, as seen in FIG. 10.

Figure 11:
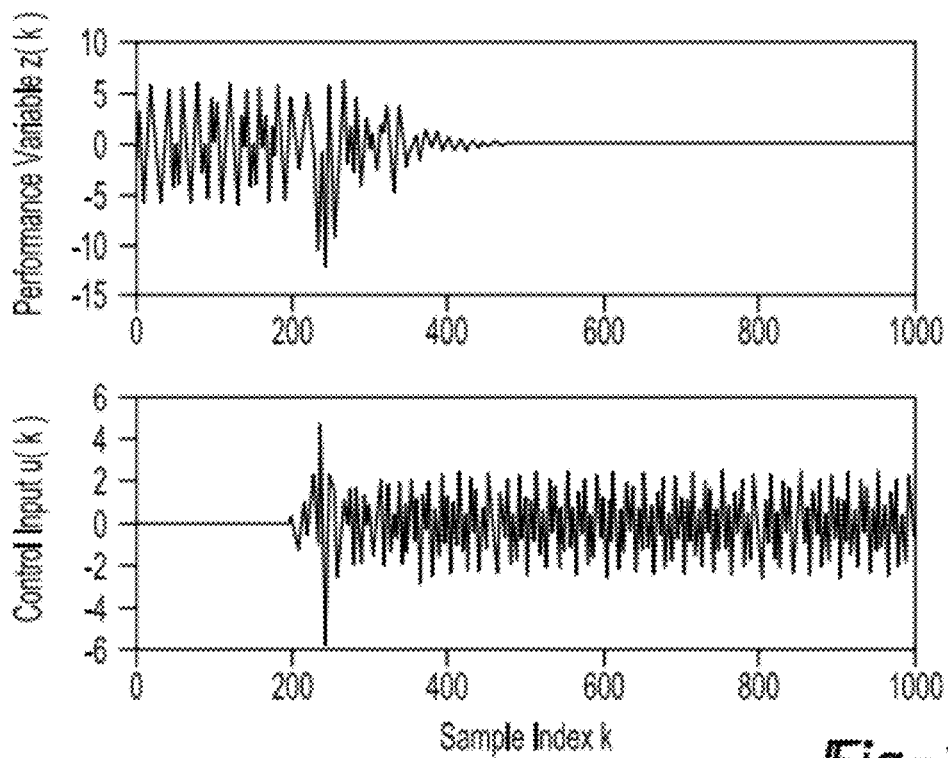

Example 7.5 (SISO, nonminimum-phase, stable plant, disturbance rejection) Consider the plant $G_{zu}$ with d=3, poles $0.5\pm0.5$ j, $-0.5\pm0.5$ j, $\pm0.9$, $\pm0.7$ j, minimum-phase zeros $0.3\pm0.7$ j, $-0.7\pm0.3$ j, and outer nonminimum-phase zero 2. We take $n_c=15$, $p=1$, $r=7$, and $\alpha(k)=25$. The Markov-parameter polynomial used to construct $\overline{B}_{zu}$ as in (56) is given by $p_7(q)=q^4-1.2q^3-0.96q^2-0.56q-0.75$, with roots $0.01\pm0.71$ j, $-0.77$, 1.94. Note that the root 1.94 approximates the zero 2. The closed-loop response is shown in FIG. 11.

Figure 12:
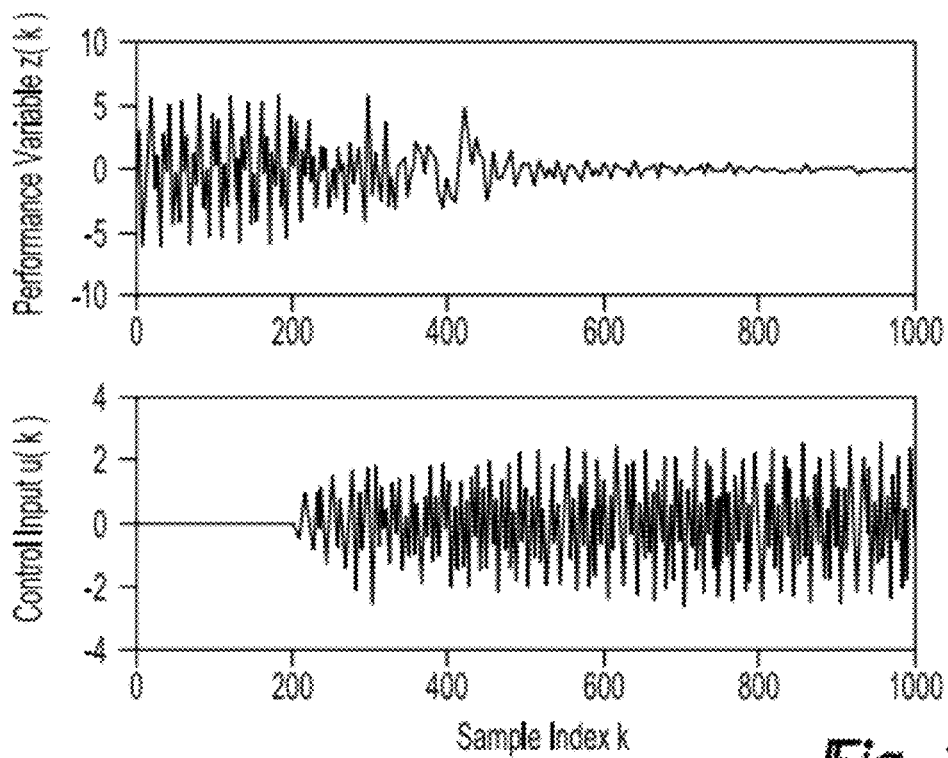

To illustrate the effect of the learning rate $\alpha(k)$, the closed-loop response is shown in FIG. 12 for $\alpha(k)=2500$ and all other parameters unchanged. Note that, with $\alpha(k)=2500$, the initial transient is reduced at the expense of convergence speed.

Figure 13:
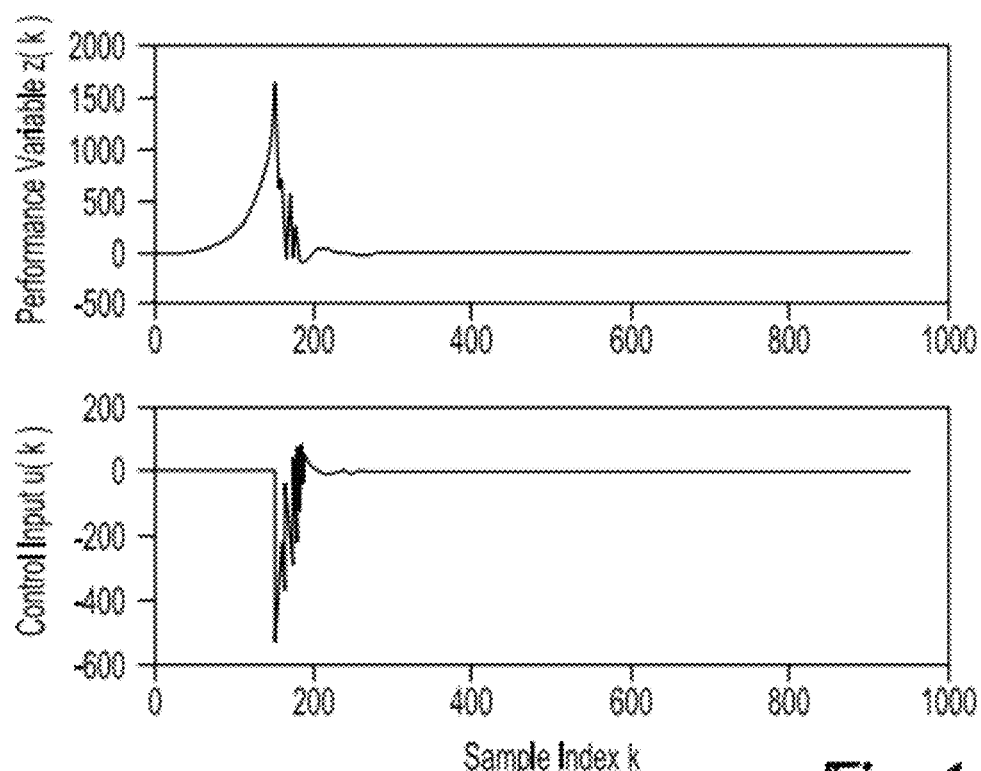

Example 7.6 (SISO, minimum-phase, unstable plant, disturbance rejection). Consider the plant $G_{zu}$ with d=3, poles $0.5\pm0.5$ j, $-0.5\pm0.5$ j, $\pm1.04$, $0.1\pm1.025$ j, and minimum-phase zeros $0.3\pm0.7$ j, $-0.7\pm0.3$ j, 0.5. We take $n_c=15$, $p=1$, $\alpha(k)=25$, and $r=10$ with $\overline{B}_{zu}$ given by (56). The closed-loop response is shown in FIG. 13.

Example 7.7 (MIMO, minimum-phase, stable plant, disturbance rejection). Consider the two-input, two-output plant $$G_{zu}(z) = \begin{bmatrix} \dfrac{z^2-0.5z}{D_1(z)} & \dfrac{z^4-0.1z^3-0.22z^2+0.59z-0.29}{D_1(z)} \\ \dfrac{z-0.5}{D_1(z)} & \dfrac{z^3-1.1z^2+0.88z-0.29}{D_1(z)} \end{bmatrix},$$

where $$D_1(z) \triangleq z^5 + 0.1z^4 + 0.09z^3 - 0.401z^2 - 0.196z - 0.2205, \quad d=1,$$

$$\text{and } H_1 = \begin{bmatrix} 0 & 1 \\ 0 & 0 \end{bmatrix}.$$

Figure 14:
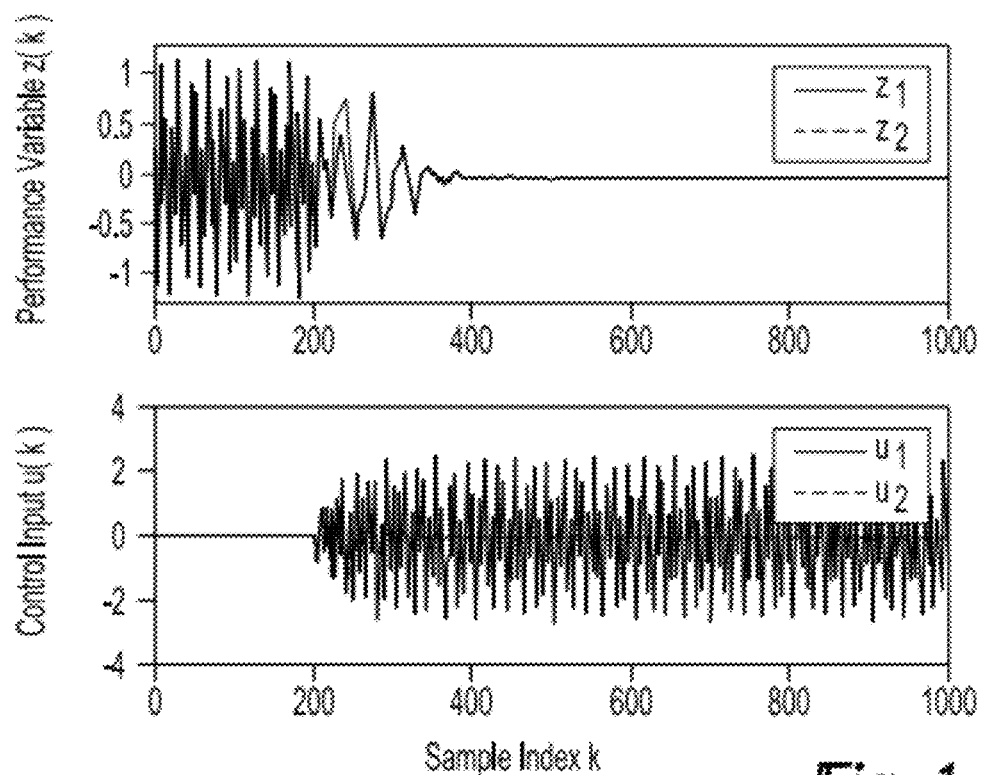

Consequently, $G_{zu}$ has poles $-0.5\pm0.5$ j, 0.9, $\pm0.7$ j, $-0.5\pm0.5$ j, 0.9, $\pm0.7$ j and minimum-phase transmission zeros $0.3\pm0.7$ j, 0.5, 0.5. We take $n_c=15$, $p=1$, $\alpha(k)=1$, and $r=10$ with $\overline{B}_{zu}$ given by (56). The closed-loop response is shown in FIG. 14.

Example 7.8 (MIMO, nonminimum-phase, stable plant, disturbance rejection) Consider the two-input, two-output plant $$G_{zu}(z) = \begin{bmatrix} \dfrac{z^2-0.5z}{D_1(z)} & \dfrac{z^2-z-2}{D_2(z)} \\ \dfrac{z-0.5}{D_1(z)} & \dfrac{z-2}{D_2(z)} \end{bmatrix},$$

where $D_1(z)$ is in given n Example 7.7, $D_2(z)z^3-0.2z^2+0.34z+0.232$, d=1, and $$H_1 = \begin{bmatrix} 0 & 1 \\ 0 & 0 \end{bmatrix}.$$

Figure 15:
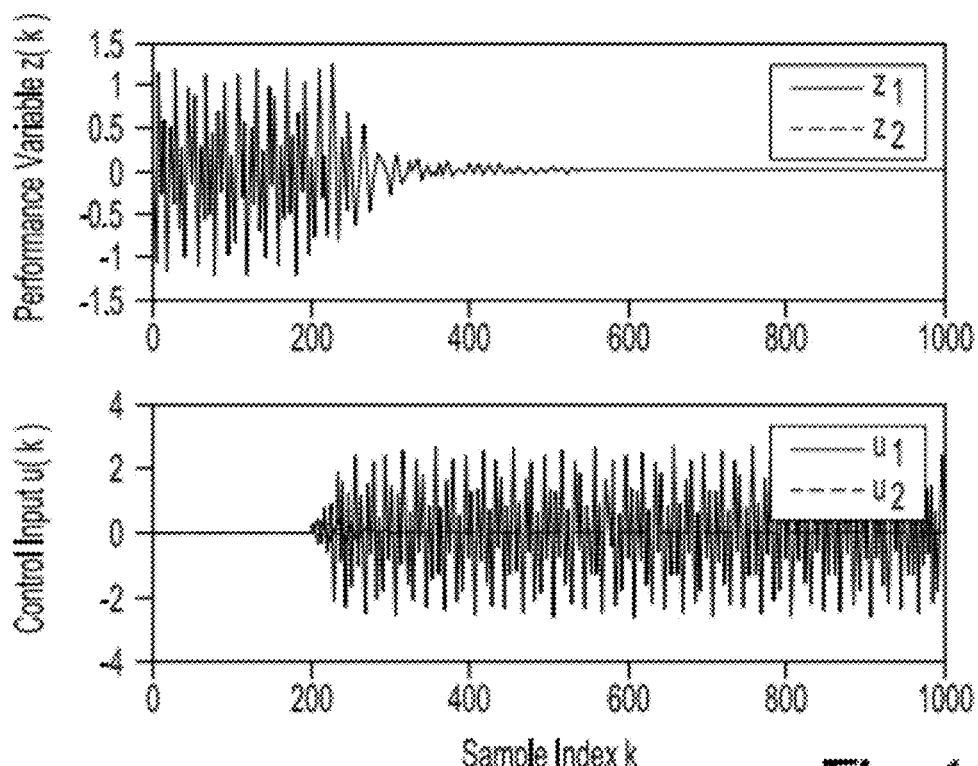

Consequently, $G_{zu}$ has poles $-0.5\pm0.5$ j, $0.3\pm0.7$ j, $\pm0.7$ j, $-0.4$, 0.9, minimum-phase transmission zero 0.5, and outer nonminimum-phase transmission zero 2. We take $n_c=15$, $p=2$, $\alpha(k)=1$, and $r=8$ with $\overline{B}_{zu}$ given by (56). The closed-loop response is shown in FIG. 15.

Example 7.9 (MIMO, nonminimum-phase, unstable plant, disturbance rejection) Consider the two-input, two-output plant $$G_{zu}(z) = \begin{bmatrix} \dfrac{z^2-0.5z}{D_3(z)} & \dfrac{z^2-z-2}{D_4(z)} \\ \dfrac{z-0.5}{D_3(z)} & \dfrac{z-2}{D_4(z)} \end{bmatrix},$$

where $$D_3(z) \triangleq z^5 - 1.1z^4 + 1.731z^3 - 1.494z^2 + 0.608z - 0.4679,$$

$$D_4(z) \triangleq z^3 + 1.4z^2 + 0.9z + 0.2, \, d=1, \text{ and } H_1 = \begin{bmatrix} 0 & 1 \\ 0 & 0 \end{bmatrix}.$$

Figure 16:
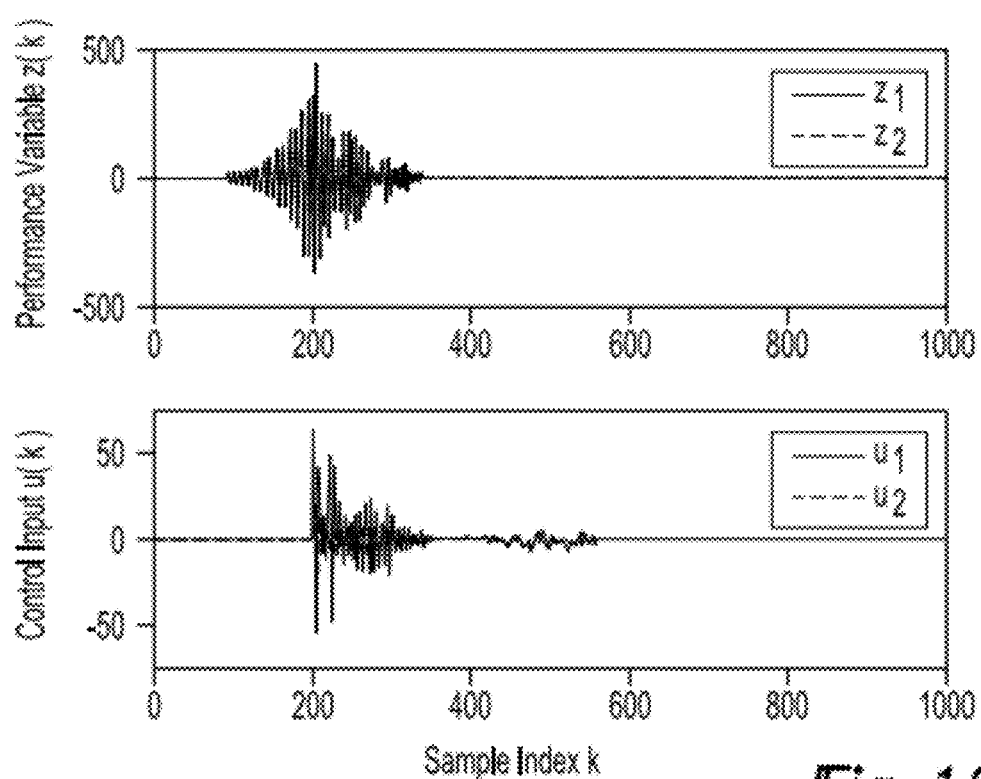

Consequently, $G_{zu}$ has poles $-0.5\pm0.5$ j, $\pm0.7$ j, $0.1\pm1.025$ j, $-0.4$, 0.9, minimum-phase transmission zero 0.5, and outer nonminimum-phase transmission zero 2. We take $n_c=10$, $p=1$, $\alpha(k)=1$, and $r=10$ with $\overline{B}_{zu}$ given by (56). The closed-loop response is shown in FIG. 16.

NUMERICAL EXAMPLES

Off-Nominal Cases

We now revisit the numerical examples of the preceding section to illustrate the response of the RCF adaptive control algorithm under conditions of uncertainty in the relative degree and Markov parameters as well as measurement noise and actuator and sensor saturation. In each example, the adaptive controller gain matrix $\theta(k)$ is initialized to zero. Unless otherwise noted, all examples assume $x(0)=0$.

Figure 17:
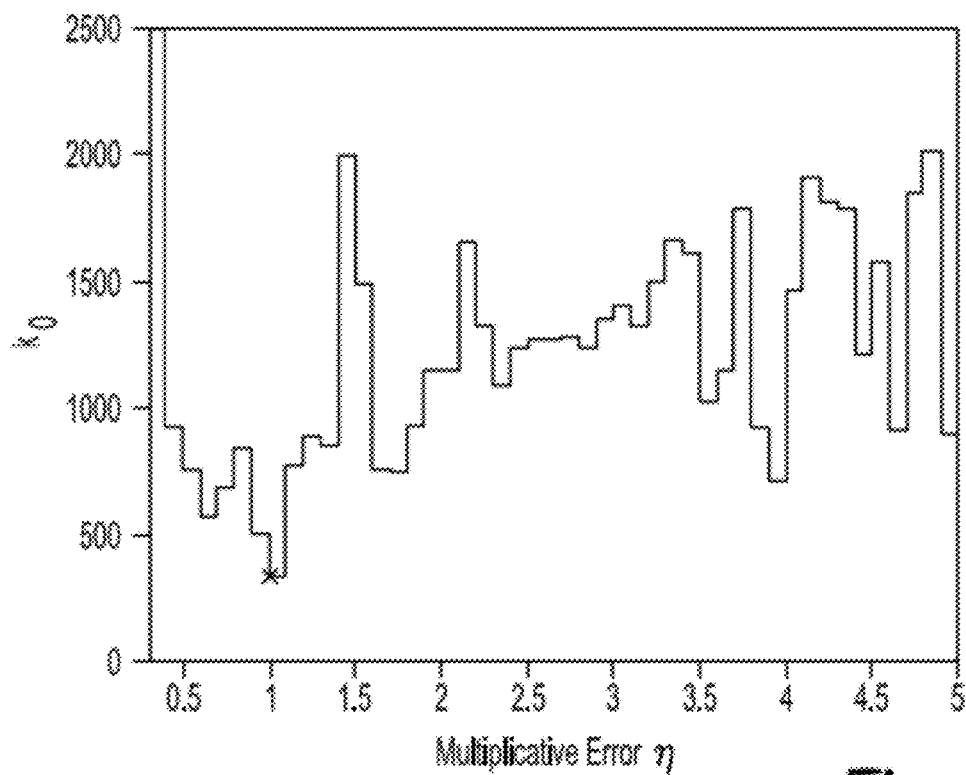

Example 8.1 (Ex. 7.5 with Markov-parameter multiplicative error) Reconsider Example 7.5 with Markov-parameter multiplicative error. For controller implementation, we use the estimate $\hat{B}\triangleq\eta B$, where $\eta\in\mathbb{R}$ is varied between 0.3 and 5. For $i=1,\ldots,r$, the estimated Markov parameters $\hat{H}_i=CA^{i-1}\hat{B}$ are used to construct $\overline{B}_{zu}$ given by (56). Taking $n_c=15$, $p=1$, $r=10$, and $\alpha(k)=1000$, the closed-loop performance is compared in FIG. 17. In each case, the control is turned on at $k=0$, and the performance metric is given by $$k_0 \triangleq \min\left\{k \geq 9 : \frac{1}{10}\sum_{i=0}^{9}|z(k-i)| < 0.01\right\}, \quad (59)$$

that is, $k_0$ is the minimum time step k such that the average of $\{|z(k-i)|\}_{i=0}^{9}$ is less than 0.01. FIG. 17 shows that the best performance is obtained for $\eta=1$, which corresponds to the true value of B. As $\eta$ is decreased, convergence slows significantly.

In the case where the sign of the first nonzero Markov parameter (the sign of the high-frequency gain) is wrong, that is, $\hat{H}_3=-J_3$, the simulation fails. These simulations suggest that performance degradation due to an unknown scaling of the Markov parameters provides a useful measure of adaptive gain margin. These findings are consistent with the adaptive gain-margin results.

Example 8.2 (Ex. 7.5 with unknown latency). A known latency of l steps can be accounted for by replacing d by d+l in the construction of $\overline{B}_{zu}$. However, we now assess the effect of unknown latency in Example 7.5, which is equivalent to uncertainty in the relative degree d. The system has relative degree $d=3$. For controller implementation, we use the erroneous estimate $\hat{d}$ of d and take $n_c=15$, $p=1$, $\alpha(k)=1000$, and $r=10$ with $\overline{B}_{zu}$ given by (56). Letting $\hat{d}$ be either 2, 3, 4, 5, or 6, Table 2 compares both the performance metric (59) and the maximum value of $|z(k)|$ for each estimate $\hat{d}$ of d. In each case, the control is turned on at $k=0$. The best performance is obtained for $\hat{d}=d=3$.

TABLE 2

Closed-loop performance comparison of the stable, nonminimum-phase, SISO plant in Example 7.5 with unknown latency.

| $\hat{d}$ | $k_0$ | max $\|z(k)\|$ |
|---|---|---|
| 2 | 1870 | 12.3 |
| 3 | 531 | 9.4 |
| 4 | 847 | 8.5 |
| 5 | 4633 | 10.9 |
| 6 | 11660 | $3.2 \times 10^9$ |

For controller implementation, we use the erroneous estimate $\hat{d}$ of d and take $n_c = 15$, $p = 1$, $\alpha(k) = 1000$, and $r = 10$ with $\overline{B}_{zu}$ given by (56). The best performance is obtained for $\hat{d} = d = 3$.

These simulations show the sensitivity of the adaptive controller to unknown errors in the relative degree d, which provides a useful measure of adaptive phase margin.

Figure 18:
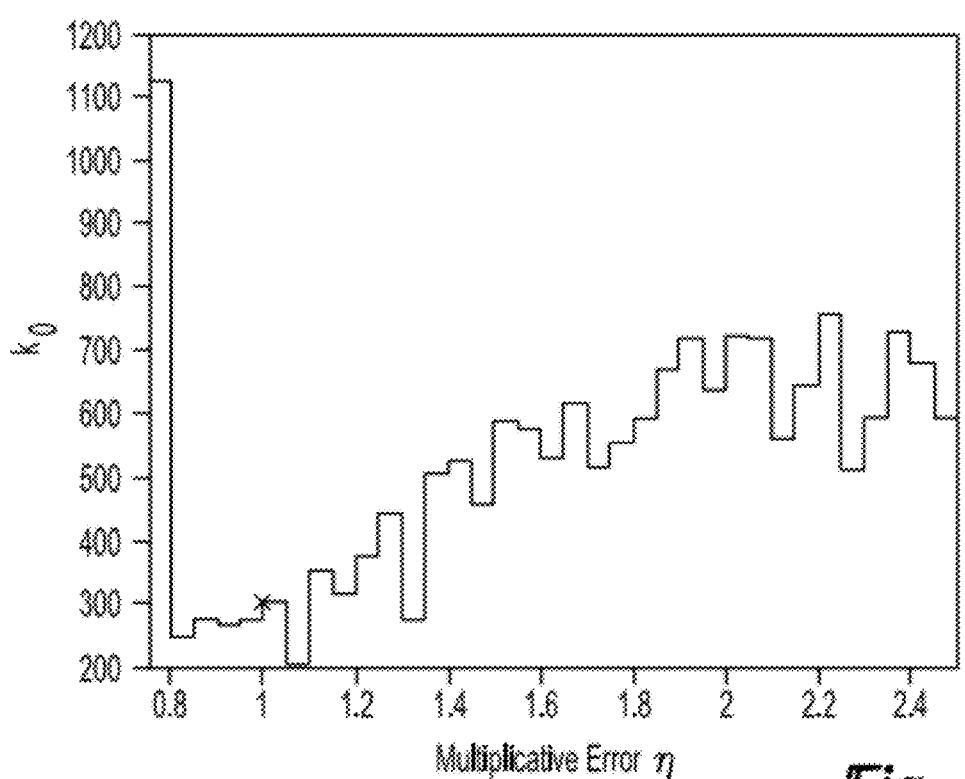

Example 8.3 (Sensitivity to nonminimum-phase-zero uncertainty). Consider the plant $G_{zu}$ with $d=1$, $H_1=1$, poles 0, 0.5, and outer nonminimum-phase zero 2. The plant is subject to disturbance w(k) given by (58), and thus, with the plant realized in controllable canonical form, we take $D_1=I_2$ and $E_0=0$. Furthermore, we assume $y=z$ and let $\phi(k)$ be given by (37). To illustrate the sensitivity of the adaptive control algorithm to knowledge of the nonminimum-phase zero, we let $\overline{B}_{zu}$ be given by (51), which is constructed using the first nonzero Markov parameter $H_1=1$, the nonminimum-phase zero 2, and a multiplicative error $\eta\in\mathbb{R}$, that is, $N(q)=q-2\eta$. We vary $\eta$ between 0.75 and 2.5 with $n_c=10$, $p=1$, and $\alpha(k)\equiv 25$. A closed-loop performance comparison is shown in FIG. 18. In each case, the control is turned on at $k=0$, and the performance metric is given by (59). The best performance is obtained for $\eta=1.05$, which is close to the true value of the nonminimum-phase zero. Note that the adaptive control algorithm is more robust to larger values of $\eta$ than smaller values.

Figure 19:
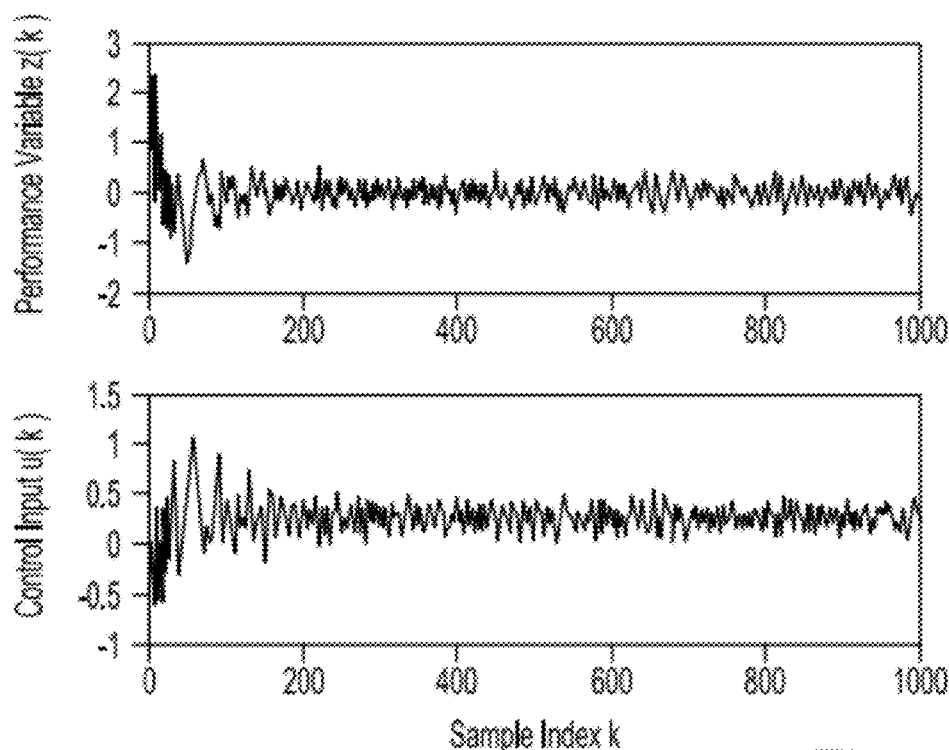

Example 8.4 (Ex. 7.6 with stabilization and noisy measurements). Reconsider Example 7.6 with no commands or disturbances. For stabilization, we take $D_1$ and $E_0$ to be zero matrices. To assess the performance of the adaptive algorithm with added sensor noise, we modify (2) and (3) by $$y(k)=z(k)=E_1x(k)+E_0w(k)+v(k), \quad (60)$$

where $v(k)\in\mathbb{R}^{l_z}$ is Gaussian white noise with mean $\overline{v}=2$ and standard deviation $\sigma=0.1$. We take $n_c=15$, $p=1$, $\alpha(k)\equiv 25$, and $r=3$ with $\overline{B}_{zu}$ given by (56). For the initial condition $$x(0)=[-0.43\ -1.67\ 0.13\ 0.29\ -1.15\ 1.19\ 1.19\ -0.04]^T,$$

the closed-loop response is shown in FIG. 19.

Figure 20:
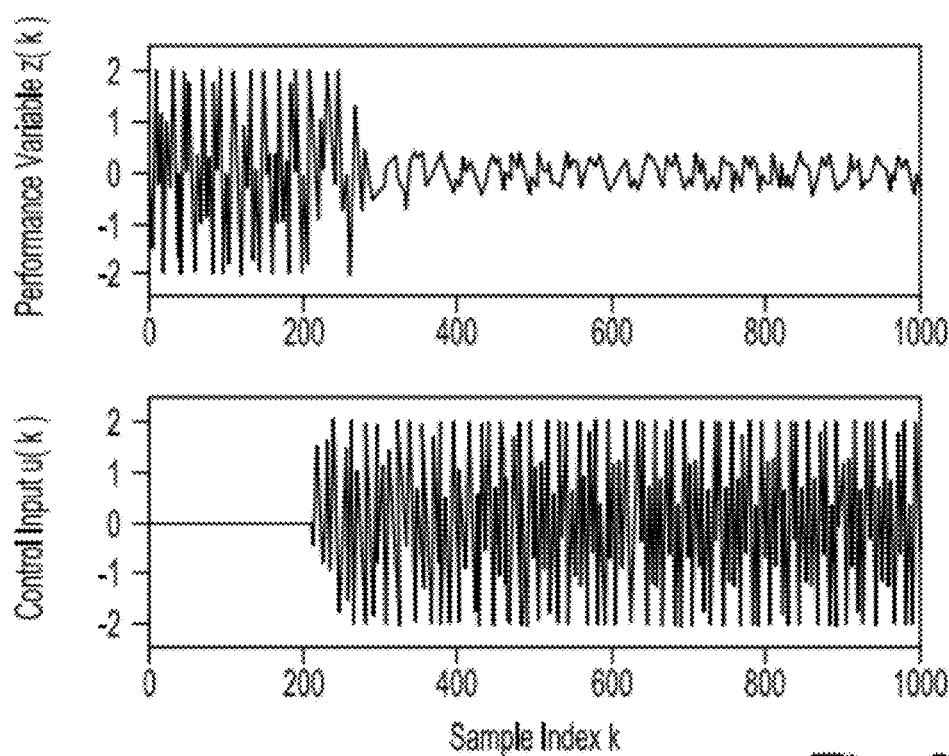

Example 8.5 (Ex. 7.4 with actuator and sensor saturation). Reconsider Example 7.4 with the additional assumption that both the control input and sensor measurement are subject to saturation at $\pm 2$. We take $n_c=15$, $p=1$, $\alpha(k)\equiv 25$, and $r=3$ with $\overline{B}_{zu}$ given by (56). The closed-loop response shown in FIG. 20 indicates that the saturations degrade steady-state performance.

Figure 21:
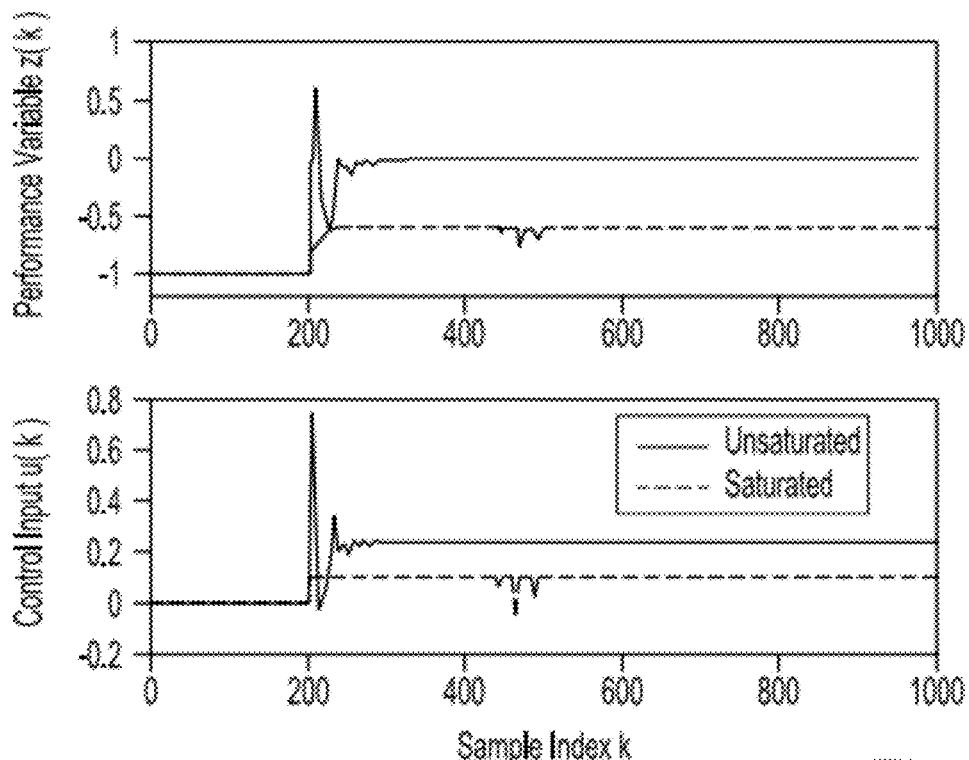

Example 8.6 (Ex. 7.4 with command following and actuator saturation). Reconsider Example 7.4 with step command given by $w(k)=1$. With the plant realized in controllable canonical form, we take $D_1=0$ and $E_0=-1$. Taking $n_c=15$, $p=1$, $\alpha(k)\equiv 25$, and $r=3$ with $\overline{B}_{zu}$ given by (56), the closed-loop responses are shown in FIG. 21 with and without actuator saturation at $\pm 0.1$. With actuator saturation, the performance variable reflects the capability of the saturated control.

Model Reference Adaptive Control

Figure 22:
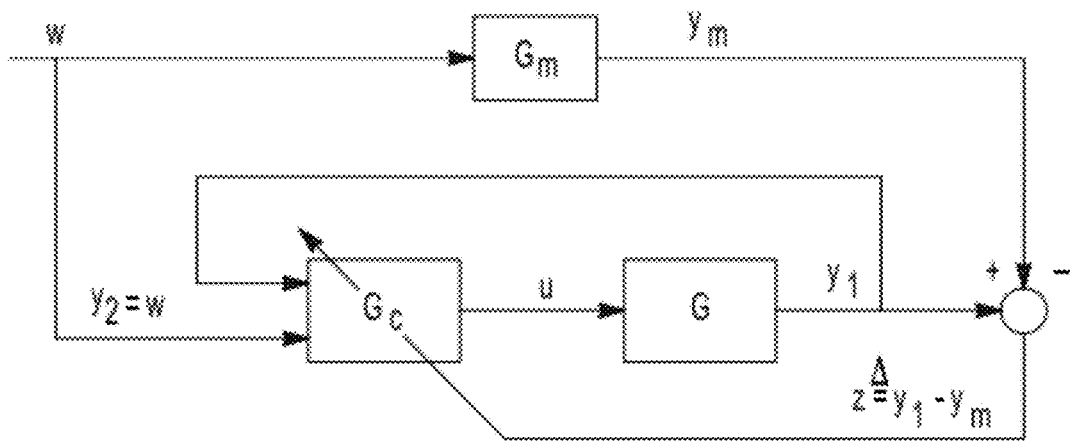

Model reference adaptive control (MRAC), as illustrated in FIG. 22, is a special case of (1)-(3), where $$z \triangleq y_1 - y_m$$

is the difference between the measured output $y_1$ of the plant G and the output $y_m$ of a reference model $G_m$. For MRAC, the exogenous command w is assumed to be available to the controller as an additional measurement variable $y_2$. Unlike standard MRAC methods, retrospective cost adaptive control does not depend on knowledge of the reference model $G_m$.

We now present numerical examples to illustrate the response of the RCF adaptive control algorithm for model reference adaptive control (see FIG. 22). Unless otherwise noted, the adaptive controller gain matrix $\theta(k)$ is initialized to zero.

Boeing 747 Longitudinal Dynamics

Consider the longitudinal dynamics of a Boeing 747 aircraft, linearized about steady flight at 40,000 ft and 774 ft/sec. The inputs to the dynamical system are taken to be elevator deflection and thrust, while the output is the pitch angle. The continuous-time equations of motion are thus given by $$\begin{bmatrix} \dot{u} \\ \dot{w} \\ \dot{q} \\ \dot{\theta} \end{bmatrix} = \begin{bmatrix} -0.003 & 0.039 & 0 & -0.322 \\ -0.065 & -0.319 & 7.74 & 0 \\ 0.020 & -0.101 & -0.429 & 0 \\ 0 & 0 & 1 & 0 \end{bmatrix} \begin{bmatrix} u \\ w \\ q \\ \theta \end{bmatrix} + \begin{bmatrix} 0.010 & 1 \\ -0.180 & -0.040 \\ -1.160 & 0.598 \\ 0 & 0 \end{bmatrix} \begin{bmatrix} \delta_e \\ \delta_T \end{bmatrix}, \quad (61)$$

$$y = \begin{bmatrix} y_1 \\ y_2 \end{bmatrix} = \begin{bmatrix} 0 & 0 & 0 & 1 \\ 0 & 0 & 0 & 0 \end{bmatrix} \begin{bmatrix} u \\ w \\ q \\ \theta \end{bmatrix} + \begin{bmatrix} 0 \\ 1 \end{bmatrix} w, \quad (62)$$

$$z = y_1 - y_m, \quad (63)$$

where w is the exogenous command and $y_m$ is the output of the reference model $$G_m(s) = \frac{Y_m(s)}{W(s)} = \frac{0.0131}{s^2 + 0.16s + 0.0131}. \quad (64)$$

Figure 23:
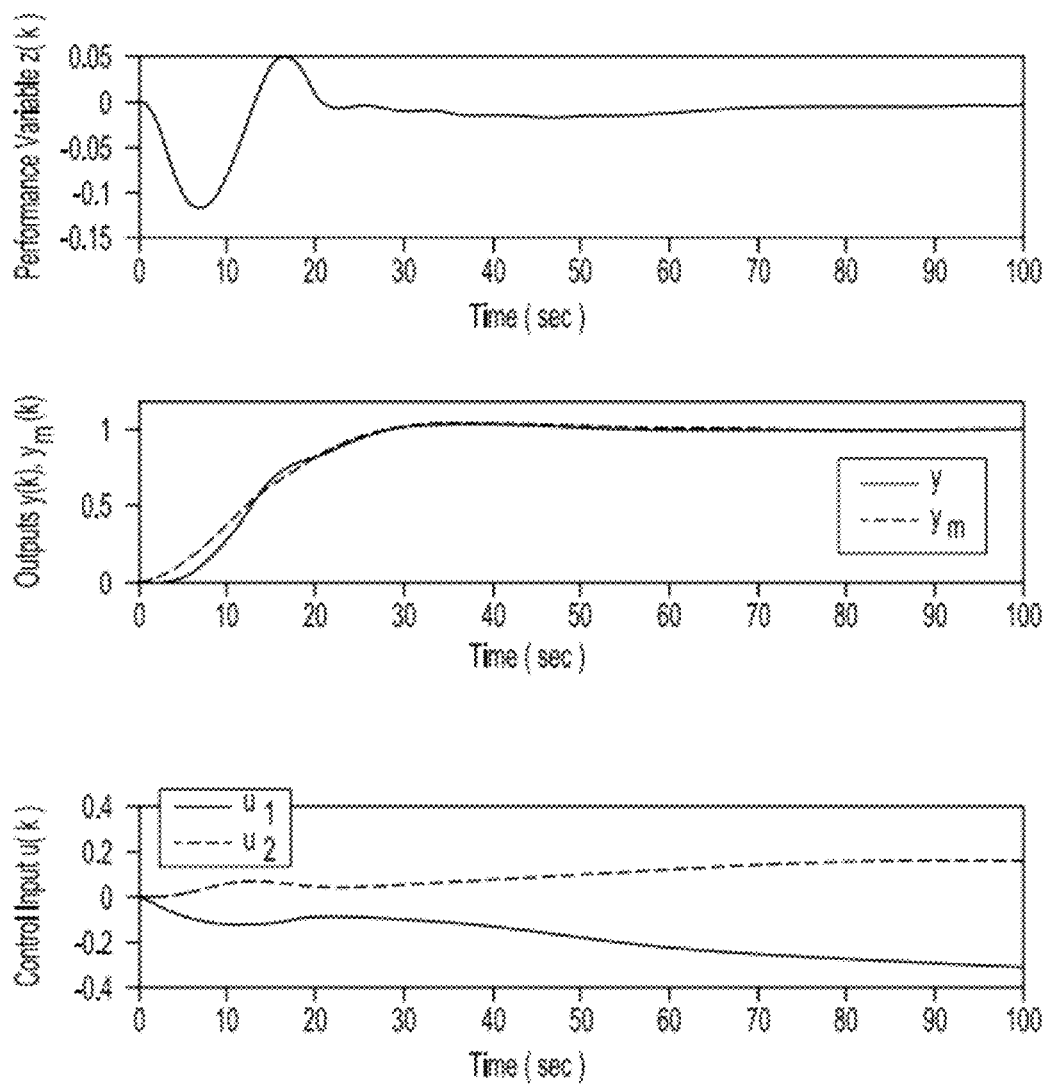

We discretize (61)-(64) using a zero-order hold and sampling time $T_s=0.01$ sec. The reference command is taken to be a 1-deg step command in pitch angle. The controller order is $n_c=10$ with parameters $p=1$, $\alpha(k)\equiv 40$, and $r=10$ with $\bar{B}_{zu}$ given by (56). The closed-loop response is shown in FIG. 23 for zero initial conditions.

Missile Longitudinal Dynamics

We now present numerical examples for MRAC of missile longitudinal dynamics under off-nominal or damage situations. The missile longitudinal plant is derived from the short period approximation of the longitudinal equations of motion, given by $$\dot{x} = \begin{bmatrix} -1.064 & 1 \\ 290.26 & 0 \end{bmatrix} x + \lambda \begin{bmatrix} -0.25 \\ -331.4 \end{bmatrix} u, \quad (65)$$

$$y = \begin{bmatrix} -123.34 & 0 \\ 0 & 1 \end{bmatrix} x + \lambda \begin{bmatrix} -13.51 \\ 0 \end{bmatrix} u, \quad (66)$$

where $$x \triangleq \begin{bmatrix} \alpha \\ q \end{bmatrix}, \quad y \triangleq \begin{bmatrix} A_z \\ q \end{bmatrix},$$

and $\lambda \in (0,1]$ represents the control effectiveness. Nominally, $\lambda=1$.

The open-loop system (65), (66) is statically unstable. To overcome this instability, a classical three-loop autopilot is wrapped around the basic missile longitudinal plant. The adaptive controller then augments the closed-loop system to provide control in off-nominal cases, that is, when $\lambda<1$. The autopilot and adaptive controller inputs are denoted $u_{ap}$ and $u_{ac}$, respectively. Thus, the total control input $u=u_{ap}+u_{ac}$. The reference model $G_m$ consists of the basic missile longitudinal plant with $\lambda=1$ and the classical three-loop autopilot. An actuator amplitude saturation of $\pm 30$ deg$=\pm 0.524$ rad is included in the model, but no actuator or sensor dynamics are included.

The goal is to have the missile follow a pitch acceleration command w consisting of a 1-g amplitude 1-Hz square wave. The performance variable z is the difference between the measured pitch acceleration $A_z$ and the reference model pitch acceleration $A_z^*$, that is, $$z \triangleq A_z - A_z^*.$$

Figure 24:
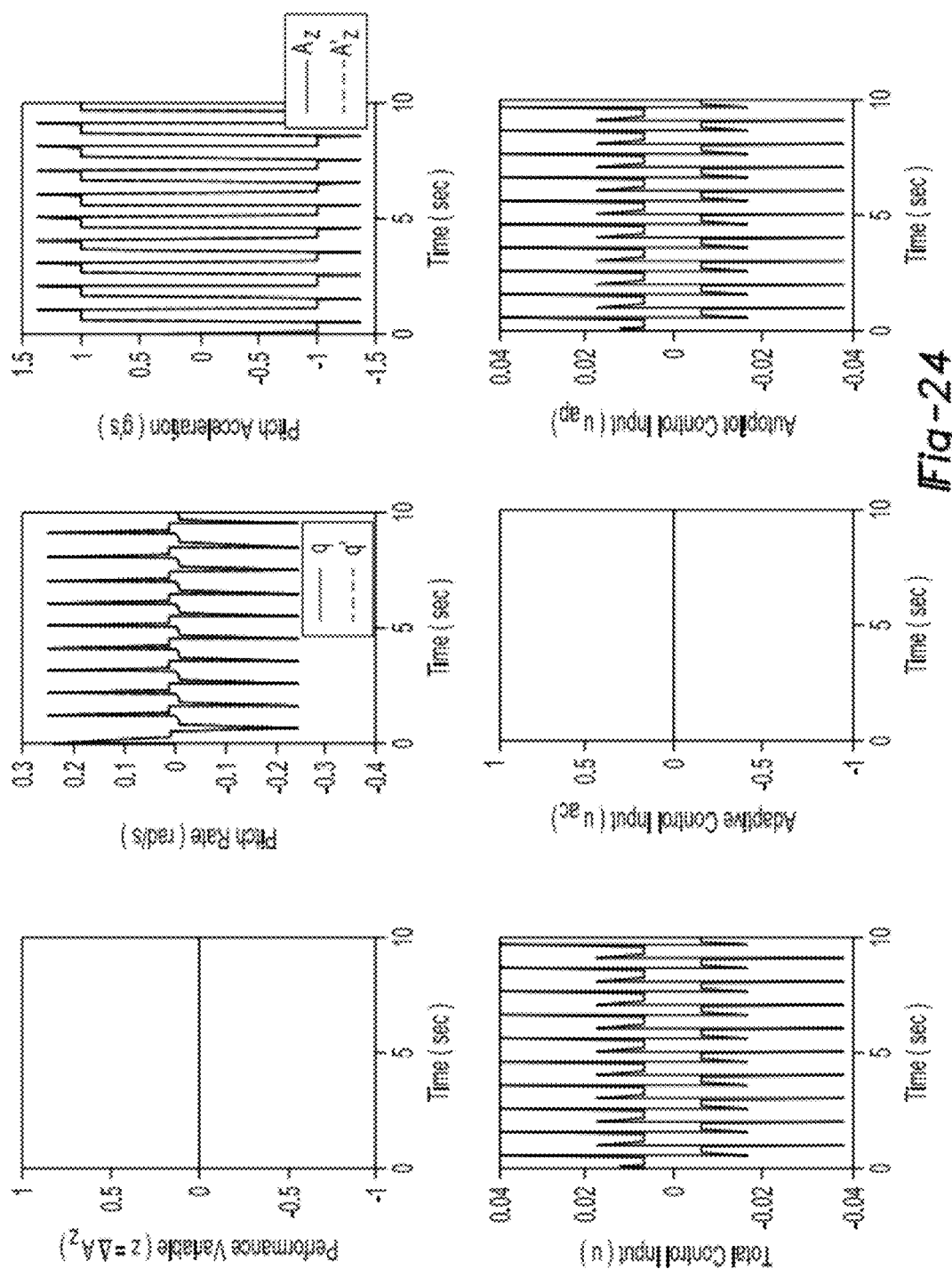

The closed-loop response is shown in FIG. 24 for $\lambda=1$. Since the plant and reference model are identical in the nominal case, the adaptive control input $u_{ac}=0$.

All of the following examples use zero initial conditions and the same adaptive controller parameters. The adaptive controller is implemented at a sampling rate of 300 Hz. We take $n_c=3$, $p=1$, and $r=20$ with $\bar{B}_{zu}$ given by (56). A time varying learning rate $\alpha(k)=75k+1$ is used such that, initially, controller adaptation is fast, and, as performance improves, the adaptation slows. The learning rate is identical for each simulation. System identification using the observer/Kalman filter identification (OKID) algorithm is used to obtain the 20 Markov parameters required for controller implementation. The offline identification procedure is performed with a nominal simulation ($\lambda=1$) by injecting band-limited white noise at the adaptive controller input $u_{ac}$ and recording the performance variable z while the autopilot is in the loop. No external disturbances are assumed to be present during the identification procedure.

Figure 25:
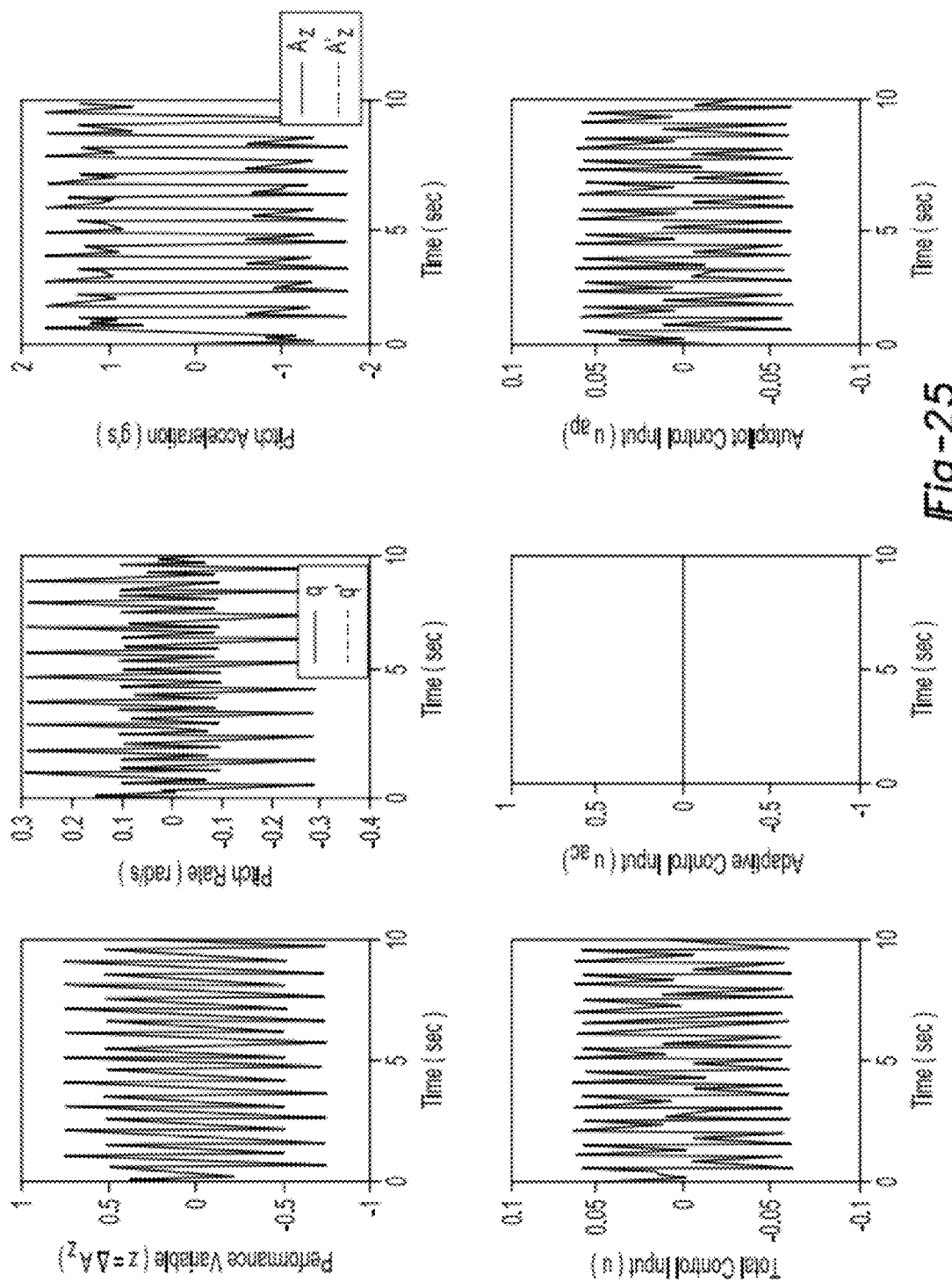
FIG. 25 depicts missile longitudinal dynamics with control effectiveness $\lambda$=0.50 and adaptive controller turned off, that is, autopilot-only control.
Figure 26:
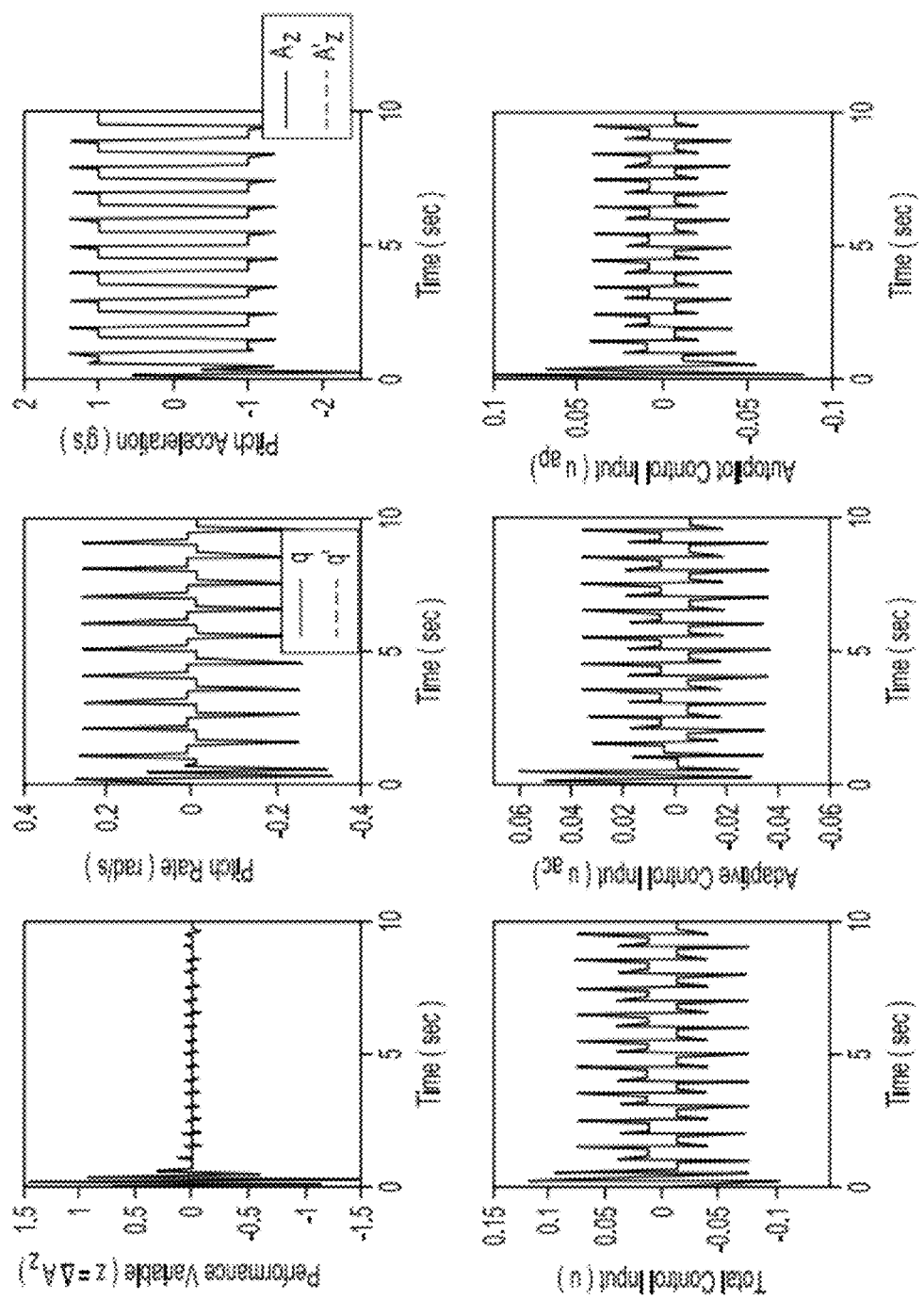
FIG. 26 depicts closed-loop model reference adaptive control of missile longitudinal dynamics with control effectiveness $\lambda$=0.50. The augmented controllers provide better performance than the autopilot-only simulation.

Example 9.1 (50% control effectiveness). Consider $\lambda=0.50$. FIG. 25 shows simulation results with the adaptive controller turned off, that is, autopilot-only control. Now, with the autopilot augmented by the adaptive controller, simulation results are shown in FIG. 26. After a transient, the augmented controllers provide better performance than the autopilot-only simulation.

Example 9.2 (25% control effectiveness). Consider $\lambda=0.25$. With the adaptive controller turned off, that is, autopilot-only control, the simulation fails. With the autopilot augmented by the adaptive controller, simulation results are shown in FIG. 27. After a transient, the augmented controllers stabilize the system, whereas the autopilot-only simulation fails.

FIG. 27 shows that the total control input u reaches the actuator saturation level of $\pm 30$ deg. To reduce the initial transient, we initialize the adaptive controller with the converged control gains $\theta$ from the 50% control effectiveness case. As shown in FIG. 28, the initial transient is reduced as compared with initializing the control gains to zero. In this case, the actuator saturation level is not reached.

CONCLUSION

We presented the RCF adaptive control algorithm, system, and method and demonstrated its effectiveness in handling nonminimum-phase zeros through numerical examples illustrating the response of the algorithm under conditions of uncertainty in the relative degree and Markov parameters, measurement noise, and actuator and sensor saturations. Bursting was not observed in any of the simulations. We also suggested metrics that can serve as gain and phase margins for discrete-time adaptive systems. Development of Lyapunov-based stability and robustness analysis of the RCF adaptive control algorithm as well as development of a theoretical foundation for analyzing broadband disturbance-rejection properties of the controller is anticipated.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A method for adaptive control of nonminimum phase systems, said method comprising:
   receiving input data;
   distinguishing between said input data and modified data;
   determining control gains from said input data and estimates of nonminimum phase zeros using a modified quadratic cost criterion that uses a retrospective performance vector;
   calculating a control signal based on said control gains, said input data, and said retrospective performance vector; and
   outputting said control signal.

2. The method according to claim 1 wherein said determining control gains comprises determining control gains using estimates of a relative degree, a first nonzero Markov parameter, and nonminimum phase zeros.

3. The method according to claim 1 wherein said determining control gains comprises determining control gains using an explicit minimizer of said modified quadratic cost criterion to achieve a minimizer in a single operational step.

4. The method according to claim 1 wherein said determining control gains comprises determining control gains using a one-step learning penalty.

5. The method according to claim 1 wherein said determining control gains from said input data and estimates of nonminimum phase zeros using a modified quadratic cost criterion comprises a disturbance rejection response.

6. The method according to claim 1 wherein said determining control gains from said input data and estimates of nonminimum phase zeros using a modified quadratic cost criterion comprises a command following response.

7. The method according to claim 1 wherein said determining control gains from said input data and estimates of nonminimum phase zeros using a modified quadratic cost criterion comprises a stabilization response.

8. The method according to claim 1, wherein said determining control gains further comprises adjusting a rate of convergence.

9. A system for adaptive control of nonminimum phase systems, said system comprising:
   a device receiving input data;
   a device distinguishing between said input data and modified data;
   a controller determining control gains from said input data and estimates of nonminimum phase zeros using a modified quadratic cost criterion, said controller calculating a control signal based on said control gains and said input data and outputting said control signal.

10. The system according to claim 9 wherein said controller determines control gains using a relative degree, a first nonzero Markov parameter, and nonminimum phase zeros.

11. The system according to claim 9 wherein said controller determines control gains using estimated Markov parameters to obtain estimates of a relative degree, a first nonzero Markov parameter, and nonminimum phase zeros.

12. The system according to claim 9 wherein said controller determines control gains using an explicit minimizer of said modified quadratic cost criterion to achieve a minimum in a single operational step.

13. The system according to claim 9 wherein said controller determines control gains using a one-step learning penalty.

14. The system according to claim 9 wherein said controller employs a modified quadratic cost criterion to define a disturbance rejection response.

15. The system according to claim 9 wherein said controller employs a modified quadratic cost criterion to define a command following response.

16. The system according to claim 9 wherein said controller employs a modified quadratic cost criterion to define a stabilization response.

17. The system according to claim 9, wherein said controller comprises a device for adjusting a rate of convergence.

* * * * *

UNITED STATES PATENT AND TRADEMARK OFFICE
CERTIFICATE OF CORRECTION

PATENT NO.           : 8,260,440 B2
APPLICATION NO.      : 12/630004
DATED                : September 4, 2012
INVENTOR(S)          : Mario A. Santillo et al.

It is certified that error appears in the above-identified patent and that said Letters Patent is hereby corrected as shown below:

| | |
|---|---|
| Column 4, line 12 (application page 7, line 7) | After "$\Omega_2$" insert -- = --. |
| Column 4, line 19 (application page 7, line 12) | After "$n_c$" insert -- = --. |
| Column 4, line 24 (application page 7, line 16) | After "$n_c$" insert -- = --. |
| Column 7, line 24 (application page 13, line 17) | "$\therefore \ddots \therefore$" should be -- $\vdots \ddots \therefore$ --. |
| Column 9, line 10 (application page 16, line 8) | Second occurrence of "=" should be -- - --. |
| Column 12, line 41 (application page 22, line 15) | "$F_{zu}$" should be -- $G_{zu}$ --. |
| Column 19, line 35 (application page 35, line 5) | "$-J_3$" should be -- $-H_3$ --. |
| Column 20, line 31 (application page 37, line 9) | "=0.43" should be -- -0.43 --. |

Signed and Sealed this
Twentieth Day of November, 2012

David J. Kappos
*Director of the United States Patent and Trademark Office*